(12) United States Patent
Kageyama et al.

(10) Patent No.: US 6,567,180 B1
(45) Date of Patent: May 20, 2003

(54) DOCUMENT PRINTING METHOD

(75) Inventors: Seiji Kageyama, Ibaraki (JP); Katsumi Kumagai, Ibaraki (JP); Tatsuro Akabane, Ibaraki (JP); Kazuyuki Mitome, Ibaraki (JP); Kazuyoshi Tokunaga, Ibaraki (JP); Tomoko Kitaura, Ibaraki (JP); Masamitsu Suzuki, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 09/323,118

(22) Filed: Jun. 1, 1999

(30) Foreign Application Priority Data

| May 29, 1998 | (JP) | ............................................. 10-149674 |
| Feb. 26, 1999 | (JP) | ............................................. 11-050075 |
| Apr. 14, 1999 | (JP) | ............................................. 11-106154 |

(51) Int. Cl.[7] .......................... G06K 15/02; G06F 3/12; G06F 13/00
(52) U.S. Cl. ...................... 358/1.15; 358/1.13; 358/1.14
(58) Field of Search ................................. 358/1.15, 1.9, 358/1.13, 1.16; 709/220–224, 223–232; 710/7–8, 18–19, 31–34, 46

(56) References Cited

U.S. PATENT DOCUMENTS 5,559,933 A * 9/1996 Boswell ....................... 395/114
5,819,015 A * 10/1998 Martin et al. ................ 395/114

* cited by examiner

Primary Examiner—Gabriel Garcia
Assistant Examiner—Douglas Tran
(74) Attorney, Agent, or Firm—Sughrue Mion, PLLC

(57) ABSTRACT

A printing method for use with a print system including a computer and a printer connected to the computer directly or by way of a network, the method including the steps of: directing the printer to effect printing and storage of a document prepared by the computer in an arbitrary combination of formats; transmitting the document to the printer; effecting receipt by the printer of the document transmitted from the computer; and effecting printing and storage of the document according to the instruction from the computer.

6 Claims, 17 Drawing Sheets

FIG. 10

● ARCHIVER PAGE (PART 1)

HOME | ARCHIVER | MANAGER | ADMIN

FOLDER TOOL MENU ■ c:¥
  f1
    f1_a
    f1_b
  f2
    f2_a
    f2_b
  f3

SELECT MENU AFTER SELECTING DOCUMENT.
DOCUMENT TOOL MENU ■

| NAME | SIZE | USER | DATE/TIME OF REGISTRATION | DATE/TIME OF THE FINAL ACCESS | AUTHORIZATION |
|---|---|---|---|---|---|
| ☐ t11 | 8bytes | kume | Feb 18 15:25 1998 | Feb 18 16:00 1998 | OK |
| ☐ t12 | 8bytes | oka | Feb 18 15:25 1998 | Feb 18 16:00 1998 | OK |
| ☐ t13 | 8bytes | kago | Feb 18 15:25 1998 | Feb 18 16:01 1998 | OK |
| ☐ test_html | 472bytes | kita | Feb 18 16:02 1998 | Feb 18 16:03 1998 | |

FIG. 11

● ARCHIVER PAGE (PART 2)

HOME | ARCHIVER | MANAGER | ADMIN

FOLDER TOOL MENU
FOLDER TOOL MENU
MAKE_
DELETION_
CHANGE OF NAME_
CHANGE OF AUTHORI-
ZATION_

- f1_b
- f2
  - f2_a
  - f2_b
- f3

SELECT MENU AFTER SELECTING DOCUMENT.
DOCUMENT TOOL MENU

| NAME | SIZE | USER | DATE/TIME OF REGISTRATION | DATE/TIME OF THE FINAL ACCESS | AUTHORIZATION |
|---|---|---|---|---|---|
| ☐ t11 | 8bytes | kume | Feb 18 15:25 1998 | Feb 18 16:00 1998 | OK |
| ☐ t12 | 8bytes | oka | Feb 18 15:25 1998 | Feb 18 16:00 1998 | OK |
| ☐ t13 | 8bytes | kago | Feb 18 15:25 1998 | Feb 18 16:01 1998 | OK |
| ☐ test_html | 472bytes | kita | Feb 18 16:02 1998 | Feb 18 16:03 1998 | |

FIG. 12

- ARCHIVER PAGE (PART 3)
  DOCUMENT-RELATED PROCESSING

HOME | ARCHIVER | MANAGER | ADMIN

| FOLDER TOOL MENU ■ |
|---|
| c:¥ |
|  f1 |
|   f1_a |
|   f1_b |
|  f2 |
|   f2_a |
|   f2_b |
|  f3 |

SELECT MENU AFTER SELECTING DOCUMENT.

DOCUMENT TOOL MENU ■
FOLDER TOOL MENU

DELETION
PRINT
CHANGE OF NAME
CHANGE OF AUTHORIZATION
VIEW/EDIT

| | SER | DATE/TIME OF REGISTRATION | DATE/TIME OF THE FINAL ACCESS | AUTHORIZATION |
|---|---|---|---|---|
| | ne | Feb 18 15:25 1998 | Feb 18 16:00 1998 | OK |
| | o | Feb 18 15:25 1998 | Feb 18 16:00 1998 | OK |
| | | Feb 18 15:25 1998 | Feb 18 16:01 1998 | OK |
| | | Feb 18 16:02 1998 | Feb 18 16:03 1998 | |

FIG. 13

● HD MANAGER PAGE (PART 1)

HOME | ARCHIVER | MANAGER | ADMIN

SELECT PRINT JOB MENU AFTER SELECTING PRINT JOB.

PRINTER MENU  ■   PRINT JOB MENU  ■   HELP!

PRINTER HD PRINTER   [ TOTAL JOB: 3 ]

| PRINT JOB | STATUS | USER | ORDER OF PRIORITY | PAGE | SIZE | RECEIVED TIME |
|---|---|---|---|---|---|---|
| ☐ aaa | SUSPEND | Administrator | 1 | 0 | 1,110 | 17:43 |
| ☐ bbb | SUSPEND | kume | 2 | 2 | 200 | 17:44 |
| ☐ ccc | SUSPEND | oka | 2 | 2 | 200 | 17:45 |

FIG. 14

FOLDER TOOL MENU

- c:¥  — 1400
  - f1
    - f1_a
    - f1_b  — 1402-1, 1411
  - f2
    - f2_a  — 1402-2, 1403-1
    - f2_b  — 1412, 1403-2
  - f3

HOME | ARCHIVER | MANAGER

DOCUMENT TOOL MENU

| | NAME | EDIT ATTRIBUTE 1402 | PRINT ATTRIBUTE 1403 | SIZE 1404 | THE NAME OF A PERSON WHO REGISTERED [DATE/TIME] 1405 | THE NAME OF A FINAL USER [DATE/TIME] 1406 |
|---|---|---|---|---|---|---|
| ○ | ▯ MH_60C | | | 1KB | Yamada [1998/04/03 19:00] | Yamada [1998/04/03 16:00] |
| ○ | ▯ MH_60A2 | ◎ | | 1000KB | Yamada [1998/04/04 14:00] | Yamada [1998/04/03 16:00] — 1411-1 |
| ○ | ▯ MH_60C2 | | ◎ | 2KB | Sato [1998/04/04 12:00] | Sato [1998/04/04 15:00] — 1411-2 |
| ○ | ▯ MH_12DB | ◎ | | 2000KB | Tanaka [1998/04/05 14:00] | Tanaka [1998/04/05 16:00] — 1412-1 |
| ○ | ▯ MH_12DC2 | | ◎ | 1000KB | Yamamoto [1998/04/06 13:00] | Yamamoto [1998/04/06 15:00] |
| ○ | ▯ MH_12DE | | | 500KB | Hayashi [1998/04/06 14:00] | Yamamoto [1998/04/06 16:00] — 1412-2 |
| ○ | | | | | | Hayashi [1998/04/04 14:00] |
| ○ | | | | 1000KB | Yoshida [1998/04/05 14:00] | Yoshida [1998/04/05 14:00] |

1401

DOCUMENT PRINTING METHOD

BACKGROUND OF THE INVENTION

1. Field of the Invention

The present invention relates to a printer utilized by a computer such as a personal computer or a workstation, a document print system using the printer, and a document printing method using the printer and the document print system.

2. Description of the Related Art

In a conventional printer and print system, contents to be printed prepared by a computer are transferred to a printer, where the contents are printed. Thus, the principal objective of the conventional printer and print system resides in the act of printing itself.

In some printers and print systems, a document is stored in the printer, and the thus-stored document is re-used for re-printing or re-editing purposes. Here, the document comprises an arbitrary combination of characters, symbols, graphic and image.

In a conventional printer and print system, when the printer stores the document, the document is not stored in the form of a print command prepared by an individual computer and transmitted (hereinafter referred to also as a "PDL") but is stored in the form of a dot image expanded in the printer (the dot image will hereinafter be simply referred to also as an "image"). Storage of a document in the form of a dot image provides superior performance in terms of re-printing but provides a lower degree of freedom in editing and causes deterioration of picture quality when the document is edited. More specifically, if the stored document is subjected to assembly editing or imposition, such as saddle stitching, Japanese-style binding, or perfect binding, or n-up which define disposing logical n sheets in a physical 1 sheet, the corresponding stored dot image is enlarged or reduced. If the dot image is enlarged or reduced by a factor of "x" (x-times or one over x, where "x" is not 1), the picture quality of the dot image is in principle deteriorated.

Further, in the conventional printer and print system, extraction of the document stored in the printer and editing of the document by means of an application program for editing (hereinafter referred to simply as an "application program") are effected on the premise that a match exists between a document format required by the application program and the format of the stored document. Hence, if no match exists, the stored document cannot be edited by means of the application program. Such a match can be ensured when a single manufacturer offers a printer for storing documents and an application program or when the printer and the program are developed by a printer manufacturer in collaboration with an application program manufacturer. However, such a match cannot be ensured when a printer and an application program are developed independently of each other. In fact, in many cases, printer manufacturers and application program manufacturers develop their own products independently.

SUMMARY OF THE INVENTION

The primary object of the present invention is to solve the aforementioned problem and to provide a print system and a document printing method, both of which have improved performance and provide improved ease of use without involvement of deterioration in picture quality of a document image.

The second object of the present invention is to solve the aforementioned problem and to provide a print system and a document printing method, both of which enable coexistence of a printer and an application program even when a format in which the printer stores a document is different from a document format required by the application program, thereby enhancing convenience and ease-of-use.

To solve the problem, the present invention employs the following measures.

According to a first aspect of the present invention, there is provided a printing method for use with a print system including a computer and a printer connected to the computer directly or by way of a network, the method comprising the steps of:

directing the printer to effect printing and storage of a document prepared by the computer in an arbitrary combination;

transmitting the document to the printer;

effecting receipt by the printer of the document transmitted from the computer; and effecting printing and storage of the document according to the instruction from the computer.

According to a second aspect of the present invention, there is provided a printing method for use with a print system including a computer and a printer connected to the computer directly or by way of a network, wherein the computer comprises a program for preparing a document and a logical printer driver for converting the document into a PDL document, directs the printer to effect printing and storage of the PDL document prepared by the computer in an arbitrary combination, and transmits the PDL document to the printer; and the printer receives the document from the computer, and effects printing and storage of the document according to the instruction from the computer.

According to a third aspect of the present invention, there is provided a printing method for use with a print system including a computer and a printer connected to the computer directly or by way of a network, wherein the computer comprises a program for directing the printer to effect printing and storage of a PDL document in an arbitrary combination and transmits a PDL document to the printer; and the printer receives the PDL document from the computer and effects printing and storage of the PDL document according to the instruction from the computer.

Preferably, when directing the printer to store a document, the computer directs use of an arbitrary combination of PDL format and dot image format as a storage format; and, in accordance with the direction relating to the storage format issued by the computer, the printer stores the document in an arbitrary combination of PDL format and dot image format.

Preferably, the computer issues a request to the printer for reprinting the document stored in an archive, and the printer determines whether or not a document of dot image format is stored in the archive, reprints the document of dot image format if the document of dot image format is found, and reprints the document after having RIPed a document of PDL format if the document of dot image format is not found in the archive.

Preferably, when the computer issues a request to the printer to display and edit a document, which has been stored in a PDL format in the archive of the printer from the computer, the document of PDL format is read from the printer and is subjected to display and editing.

Preferably, when the computer issues a request to the printer to display and edit a document, which has been stored in a storage format in the archive of the printer from the computer, the printer determines whether or not the format of the document stored in the printer is identical with the display/editing format required by an application program for editing purposes installed in the computer;

if the formats are identical, the document is read and transferred to the computer without modification; but if the formats differ from each other, the document stored in the archive is converted into a document of display/editing format, through use of a document format conversion section provided in the printer.

Preferably, when the computer issues a request to the printer for displaying and editing a document, which has been stored in PDL format in an archive of the printer from the computer, the printer converts the document of PDL format stored in the archive into a document of display/editing format through use of a PDL format conversion section provided in the printer and transfers the thus-converted document to the computer, and an application program 1 for editing purpose, which is one of a document preparation program and a combination instruction program and is installed in the computer, reads the document of display/editing format transferred from the printer, and subjects the document to display and editing.

Preferably, a document transmitted from the computer is stored in a storage format called PDL format in an archive of the printer;

the computer issues a request to the printer for displaying and editing the document;

the printer determines whether or not the format of the document stored in the printer is identical with a document formal which is called display/editing format and is required by an application program for editing purpose installed in the computer, and reading and sending the document to the computer without modification if the formats are identical;

if the formats differ from each other, the printer converts the document of PDL format (storage format) stored in the archive into a document of display/editing format through use of a PDL format conversion section provided in the printer and transfers the thus-converted document to the computer; and an application program 1 for editing purpose, which is one of a document preparation program and a combination instruction program and is installed in the computer, reads the document of display/editing format transferred from the printer and subjects the document to display and editing.

Preferably, a document transmitted from the computer is stored in a compressed or uncompressed dot image format in an archive of the printer;

the computer issues a request to the printer for displaying and editing the document; the printer determines the format of the document stored in the printer and reads and transfers the document to the computer without modification if the document is of uncompressed dot image format;

if the document is of compressed dot image format, the printer converts the document of compressed dot image format stored in the archive into a document of uncompressed dot image format through use of an image format conversion section and transfers the thus-converted document to the computer; and an application program 2 for editing purpose, which is one of a document preparation program and a combination instruction program and is installed in the computer, reads the document of uncompressed dot image format transferred from the printer and subjects the document to display and editing.

Preferably, when the computer directs the printer to store a document, use of an arbitrary combination of PDL format, display/editing format, and dot image format is directed as a storage format; and in accordance with the direction relating to the storage format issued by the computer, the printer stores the document in an arbitrary combination of PDL format, display/editing format, and dot image format.

Preferably, each of the documents stored in the archive is managed by reference to a name and attributes assigned to the document;

the attributes comprise a storage format group which includes an arbitrary combination of PDL format, display/editing formats uncompressed dot image format, and compressed dot image format;

when the computer issues a request to the printer for reprinting the document by reference to the document name thereof, a reprinting section provided in the printer determines, from the document name, in conjunction with the storage format group, which is one of the attributes of the document stored in the archive, that the document is stored in any combination of PDL format, display/editing format, uncompressed dot image format, and compressed dot image format; and the document is reprinted by means of an optimum method corresponding to the result of the determination.

Preferably, each of the documents stored in the archive is managed by reference to a name and attributes assigned to the document;

the attributes comprise a storage format group which includes an arbitrary combination of PDL format, display/editing format, uncompressed dot image format, and compressed dot image format;

when the computer issues a request to the printer for reprinting the document by reference to the document name thereof, a reprinting section provided in the printer determines, from the document name, in conjunction with the storage format group, which is one of the attributes of the document stored in the archive, that the document is stored in any combination of PDL format, display/editing format, uncompressed dot image format, and compressed dot image format; and the document is displayed and edited by means of an application program for editing purpose according to an optimum method corresponding to the result of the determination.

According to a fourth aspect of the present invention, there is provided a printing method for use with a print system including a computer and a printer connected to the computer directly or by way of a network, wherein a document stored in the computer is transferred to and temporarily stored in a storage folder provided in a printer controller through file transfer; and the document is again transferred to a target archive within the printer controller from the storage folder, where the document has been temporarily stored, after normal completion of temporal storage of the document has been ascertained.

According to a fifth aspect of the present invention, there is provided a printing method for use with a print system including a computer and a printer connected to the computer directly or by way of a network, wherein storage of a document stored in the computer to an archive within a printer controller is effected according to procedures comprising the steps of:

(1) an archive control instruction section provided in the computer issues a document storage start request to an archive control service section provided in the printer controller while a storage folder name is attached to the start request as an additional parameter;

(2) after the archive control service section has prepared, as a storage folder name designated by the additional parameter, a work directory for storing a file received by a file transfer receiving section, the printer controller stores the received document file under the storage folder name;

(3) the archive control instruction section issues a document transfer instruction to the file transfer sending section and directs the computer to transfer a document file sequence to the printer controller while a document file name sequence is attached to the document file sequence as an additional parameter;

(4) a file transfer sending section issues a file transmission instruction to the file transfer receiving section, thereby transferring the document file sequence to the file transfer receiving section while the document file name sequence is attached to the document file sequence as an additional parameter;

(5) the file transfer receiving section stores the thus-received document file sequence in a storage folder;

(6) after the file transfer receiving section has completed storage of all the document files into the storage folder in step (5), a transfer completion report is transmitted to the file transfer sending section;

(7) the file transfer sending section transfers the transfer completion report to a transfer completion confirmation section provided in the archive control instruction section, thus reporting that all the document files have been stored in the storage folder within the printer controller;

(8) the archive control instruction section issues a document storage completion request to the archive control service section, thereby directing the archive control service section to store the received document sequence into the storage folder while a sequence pair comprising (a) a new storage folder name and (b) a new document file name is attached to each of the documents as an additional parameter, and the names (a) and (b) enabling attachment of a new storage folder name and a new document file name to each of the document files; and (9) archive-storing section of the archive control service section stores individual documents stored in the storage folder into the archive by reference to the names (a) and (b).

BRIEF DESCRIPTION OF THE DRAWINGS

FIG. 10 is a diagram for describing a user interface of the computer according to the present invention;

FIG. 11 is a diagram for describing a user interface of the computer according to the present invention;

FIG. 12 is a diagram for describing a user interface of the computer according to the present invention;

FIG. 13 is a diagram for describing a user interface of the computer according to the present invention;

FIG. 14 is a diagram for describing a user interface of the computer according to the present invention;

DETAILED DESCRIPTION OF THE PRESENT INVENTION

Figure 1:
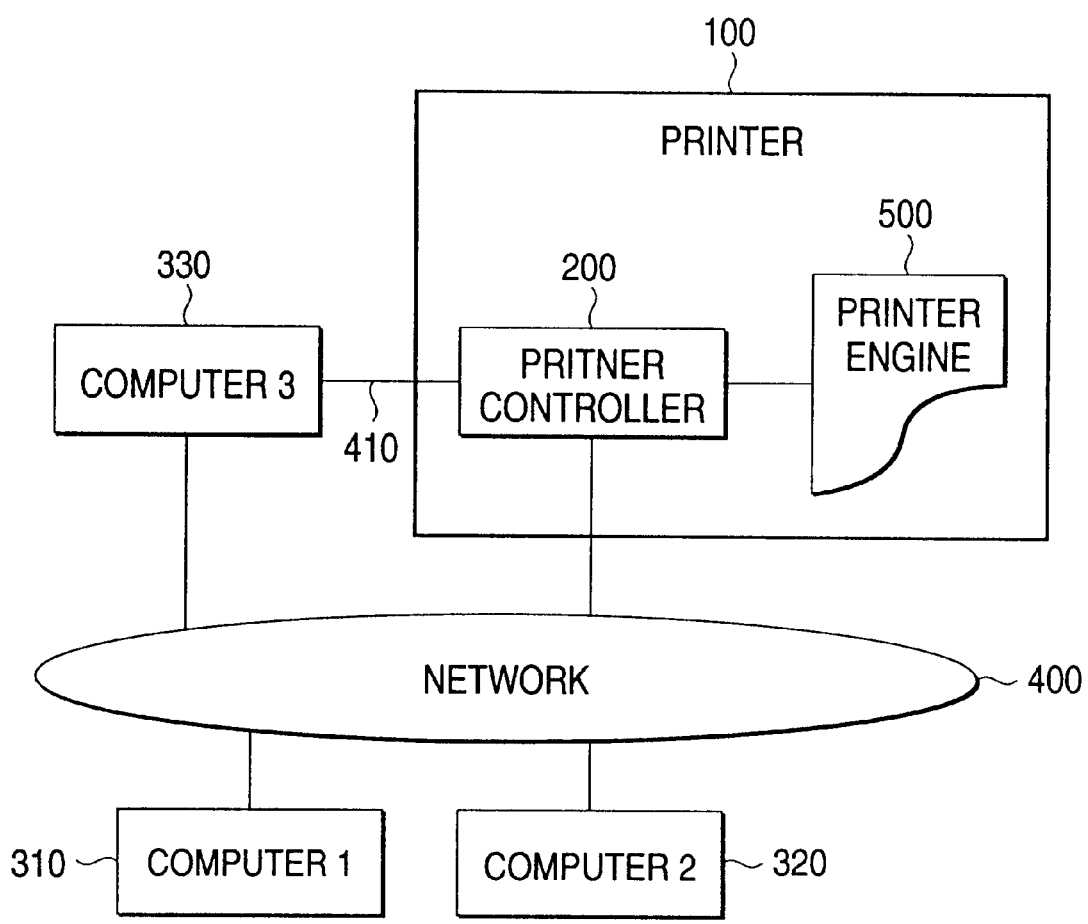
FIG. 1 is a block diagram showing the configuration of a printer and a print system according to the present invention.

The present invention will be described in detail hereinafter accompanying with drawings. The overall configuration of a print system according to the present embodiment will be described by reference to FIG. 1.

The print system comprises a network 400, a first computer 310, a second computer 320, a third computer 330, and a printer 100. The computers 310, 320, 330 and the printer 100 are connected to the network 400.

The printer 100 comprises a printer controller 200 and a printer engine 500. The printer controller 200 receives a series of a print commands referred to as a PDL document from each of the computers 310, 320, and 330 and transmits dot image data to the printer engine 500 after having subjected the print commands to a round of printing processes. The printer engine 500 receives the dot image data and physically prints the image data on a sheet through use of a printer mechanism. Various methods may be employed as the print mechanism; e.g., electrophotography using a laser optical system, electrophotography using an LED, electrophotography using a liquid-crystal shutter, an ink-jet printing method, and a shuttle impact printing method and the like.

The following description pertains to an electrophotographic page printer. The present invention can be embodied in a like manner even when an ink-jet printer or a line printer—which prints a line as a unit—is employed as a print mechanism.

The individual computers are devices which request the printer to print and store documents and are also called clients. Hereinafter, the computers will often be referred to also as "clients".

Figure 16:
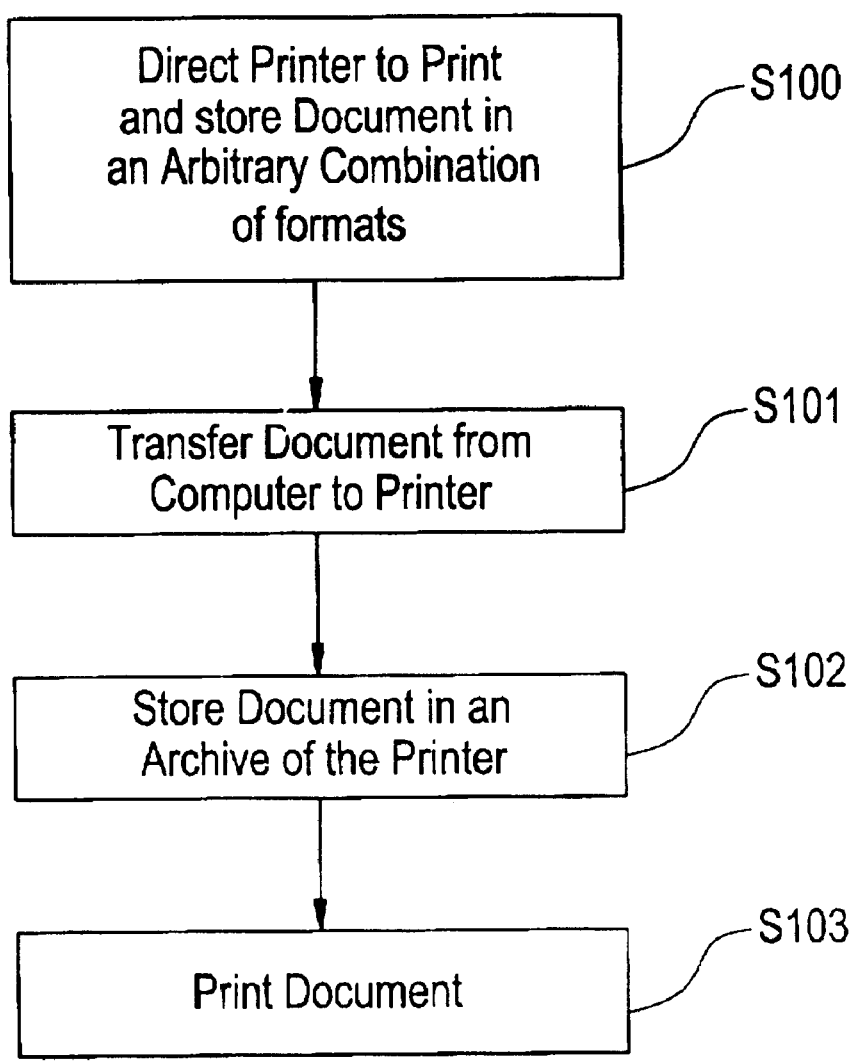
FIG. 16 is a flow diagram showing the operations of a non-limiting embodiment of the present invention.

FIG. 16, a flow diagram showing the operations of a non-limiting embodiment of the present invention, will now be described. In operation S100, a computer directs a printer to print and store a document prepared by the computer in an arbitrary combination of formats. In operation S101, the document is transferred from the computer to the printer. In operation S102, the document is printed according to the instruction from the computer. In operation S103, the document is stored in an archive of the printer according to the instruction from the computer. The operations shown in FIG. 16 are discussed in greater detail at least on pages 27 to 31.

As will be described later in connection with FIG. 3, in each of the individual computers 310, 320, and 330, a type-1 application program section 3140 prepares a document. The computer then directs a logical printer driver 3130 to convert the document into a PDL document, and directs a printer to effect printing and storage of the thus-converted PDL document in any arbitrary combination. The logical printer driver section 3130 receives the document (described in the format determined by the type-1 application program) from the type-1 application program section 3140 and converts the thus-received document into a PDL document. After having converted the document into the PDL document, the logical printer driver 3130 directs the printer 100 to effect the processing (an arbitrary combination of printing and storage operations) instructed by the type-1 application program section 3140 and transmits the PDL document to the printer 100.

In each of the computers 310, 320, and 330, a type-2 application program section 3150 directs the printer to effect printing and storage of the PDL document, which has already been stored in the file of the computer, in an arbitrary combination.

The printer 100 receives the PDL document from any of the computers 310, 320, and 330 and effects printing and storage of the PDL document in accordance with an instruction issued by the computer. The storage and printing of the PDL document by the printer will be described in detail later by reference to FIGS. 2 and 6.

The configuration of each of the computers 310, 320, and 330 will now be described by reference to FIG. 3. Each of the three computers 310, 320, and 330 is identical in configuration with a computer 300 shown in FIG. 3. The computer 300 comprises a first communications section 3110, a first OS kernel section 3120, the logical printer driver section 3130, the type-1 application program section 3140, the type-2 application program section 3150, a spool control instruction section 3160, an archive control instruction section 3170, and a printer configuration management instruction section 3180.

The first communications section 3110 comprises hardware and software and enables the computer 300 to establish, over the network 400, communication with individual devices (e.g., computers, a printer, a scanner, etc.) connected to the network 400. The scanner is omitted from the drawings. The first OS kernel section 3120 is principal software (also called an operating system) for controlling a user interface and hardware constituting the computer 300. The first communications section 3110 can be deemed as constituting a portion of the first OS kernel 3120 and is shown as an independent element in order to clarify the relationship between the first communications section 3110 and the first OS kernel 3120.

The type-1 application program 3140 is a program used for effecting word processing, spreadsheet processing, preparation of a graphic document, preparation of an image document, arrangement of a document, and like processing operations. The type-1 application program section 3140 prepares various types of documents and directs the printer 100 to process the thus-prepared documents. More specifically, the type-1 application program section 3140 directs the printer 100 to effect printing and storage of the document in an arbitrary combination.

The logical printer driver section 3130 converts the document prepared by the type-1 application program section 3140 into a format (hereinafter referred to as a "PDL format") which enables the printer controller 200 to accept and print the document, such as print commands string and a page description language. The thus-converted document is transmitted from the logical printer driver section 3130 to the printer controller 200 by way of the first OS kernel section 3120 and the first communications section 3110. The computer 300 is connected to the printer controller 200 via a printer local interface 105 or the network 400. The connection via the printer local interface 105 and the connection via the network 400 have the same principal function.

Examples of the PDL format comprise PostScript (registered trademark) by Adobe Corporation, PDF (Portable Document Format; registered trademark) by Adobe Corporation, PCL-5, PCL-5E, PCL-6, and PCL-XL (all of which are registered trademarks) by Hewlett Packard Corporation, and like formats.

The spool control instruction section 3160 is employed by the computer 300 when the computer 300 directs a spool control service section 2110 provided in the printer controller 200 to effect spool control, such as referring to the order of stored print jobs waiting to be processed, referring to occurrence of failures, referring to details and states of failures, changing of the order of the print jobs, and deletion of the print jobs. FIG. 13 shows the outline of an user interface for embodying the foregoing functions. The spool and the print job will be described later by reference to FIG. 6.

The archive control instruction section 3170 is used when the computer 300 directs an archive control service section 2230 provided in the printer controller 200 to display a list of the document(s) stored therein, to delete the document(s), to re-print the document(s), or to display and edit the document(s) Further, the archive control instruction section 3170 is used to control the composition of folders in an archive 2200. The whole archive 2200 is divided into plural small size units. Each unit is named as Folder. Documents are grouped into corresponding folders, and the user can classify and store a great quantity of documents by means of the folders. At the time of retrieval of a document from the archive, the user can efficiently retrieve a target document, because the documents are organized according to folders.

While the composition of folders is being controlled, making and deletion of folders and changing names of folders are effected. FIGS. 10, 11, and 12 show the overview of a user interface for embodying the foregoing functions. FIG. 10 shows an example of hierarchical folders.

The printer configuration management instruction section 3180 is used when the computer 300 directs a printer configuration management service section 2000 provided in the printer controller 200 to refer to configuration settings for the printer 100 and statistical information pertaining to the printer.

Figure 9:
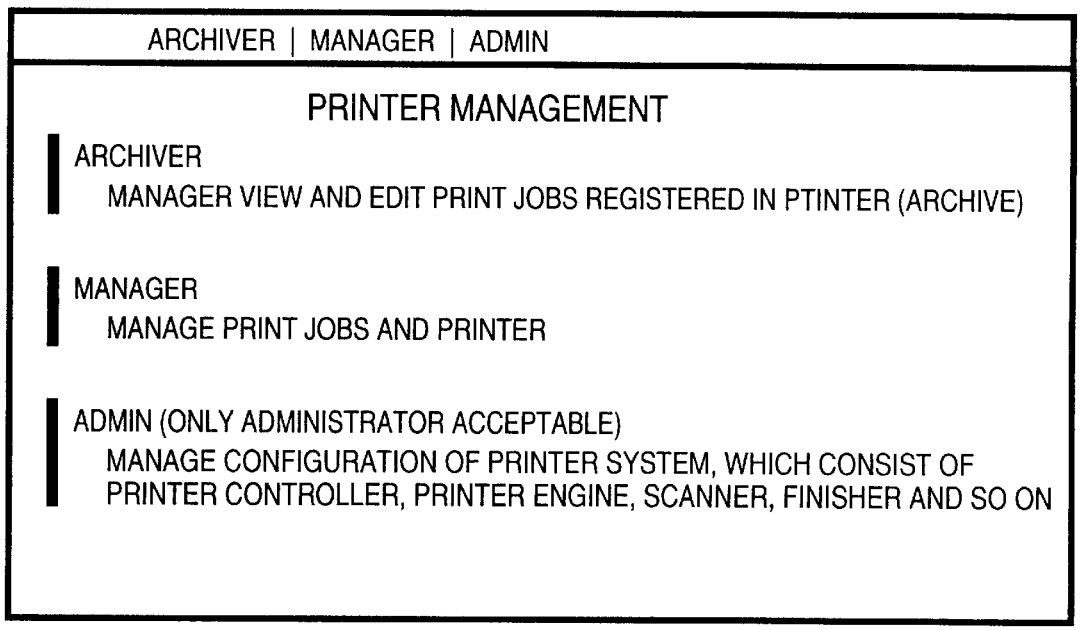
FIG. 9 is a diagram for describing a user interface of the computer according to the present invention.

FIG. 9 shows the overall configuration of the previously-described user interface employed by the computer 300.

Figure 4:
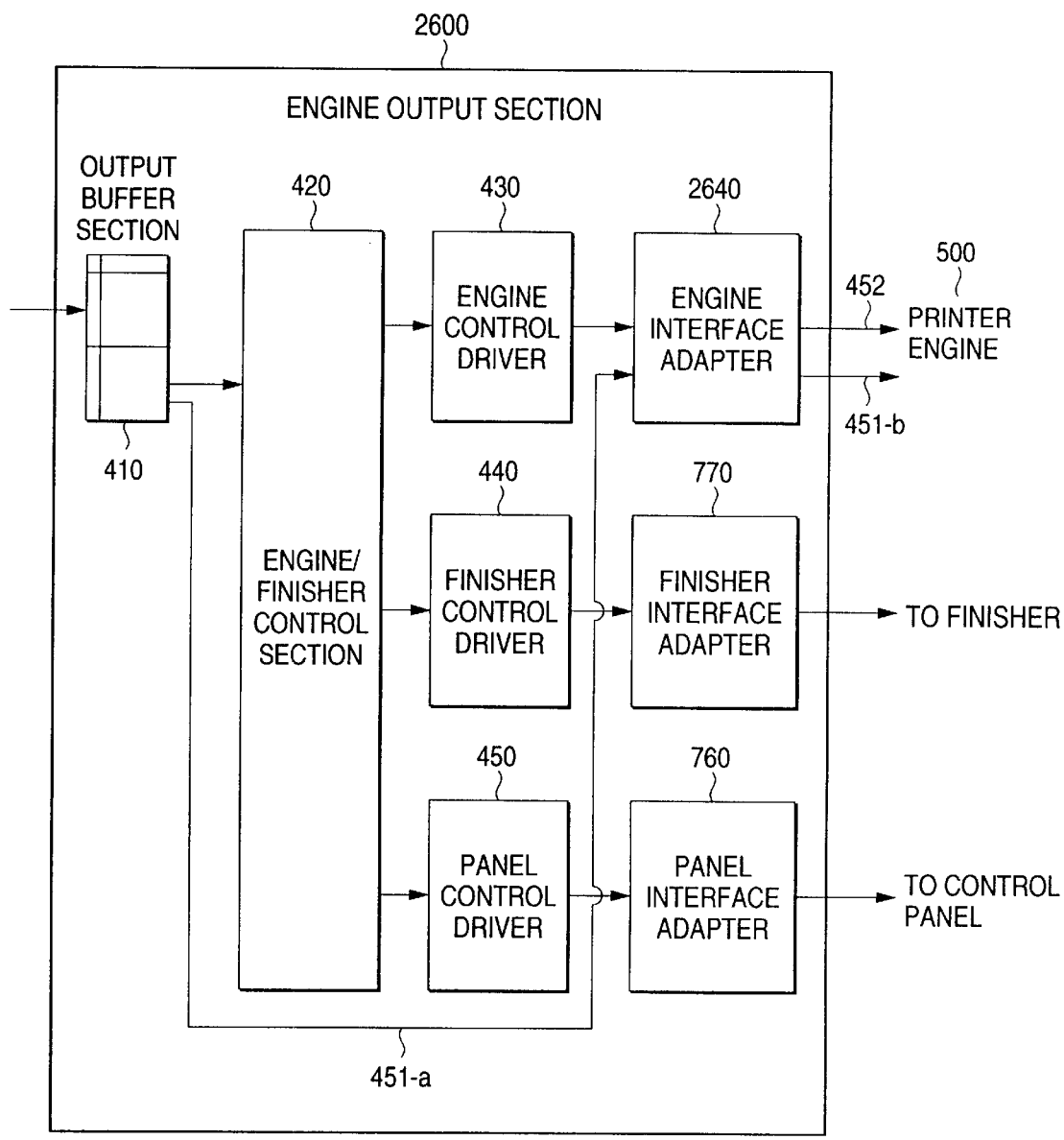
FIG. 4 is a functional block diagram for describing a method of controlling an engine output section of the printer controller according to the present invention.
Figure 5:
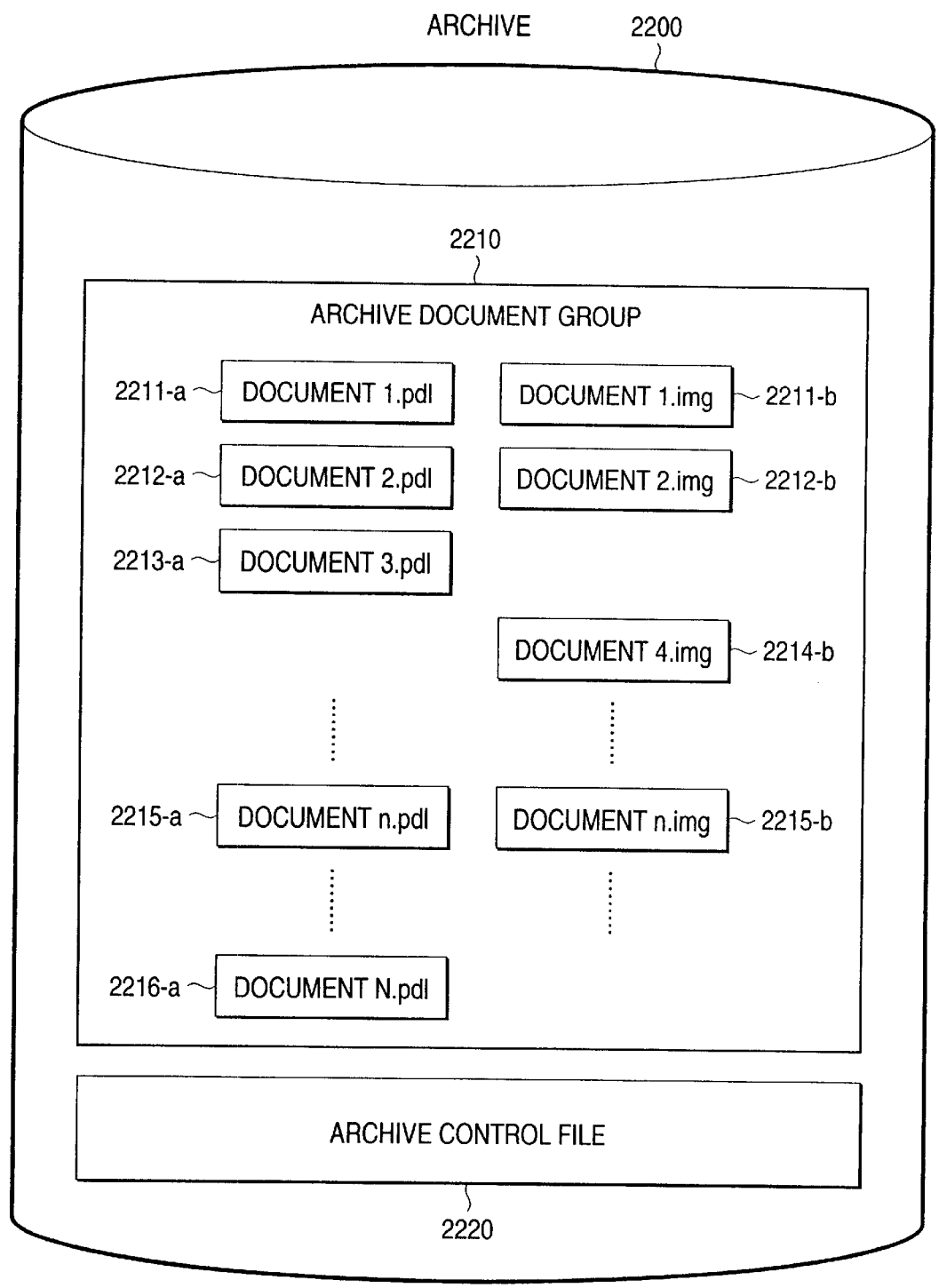
FIG. 5 is a schematic representation for describing an archive of the printer controller according to the present invention.

Processing performed in the printer controller 200 will be described in detail by reference to FIGS. 2, 4, and 5. Before that, the configuration of the printer controller 200 will be described by reference to FIG. 6.

Figure 6:
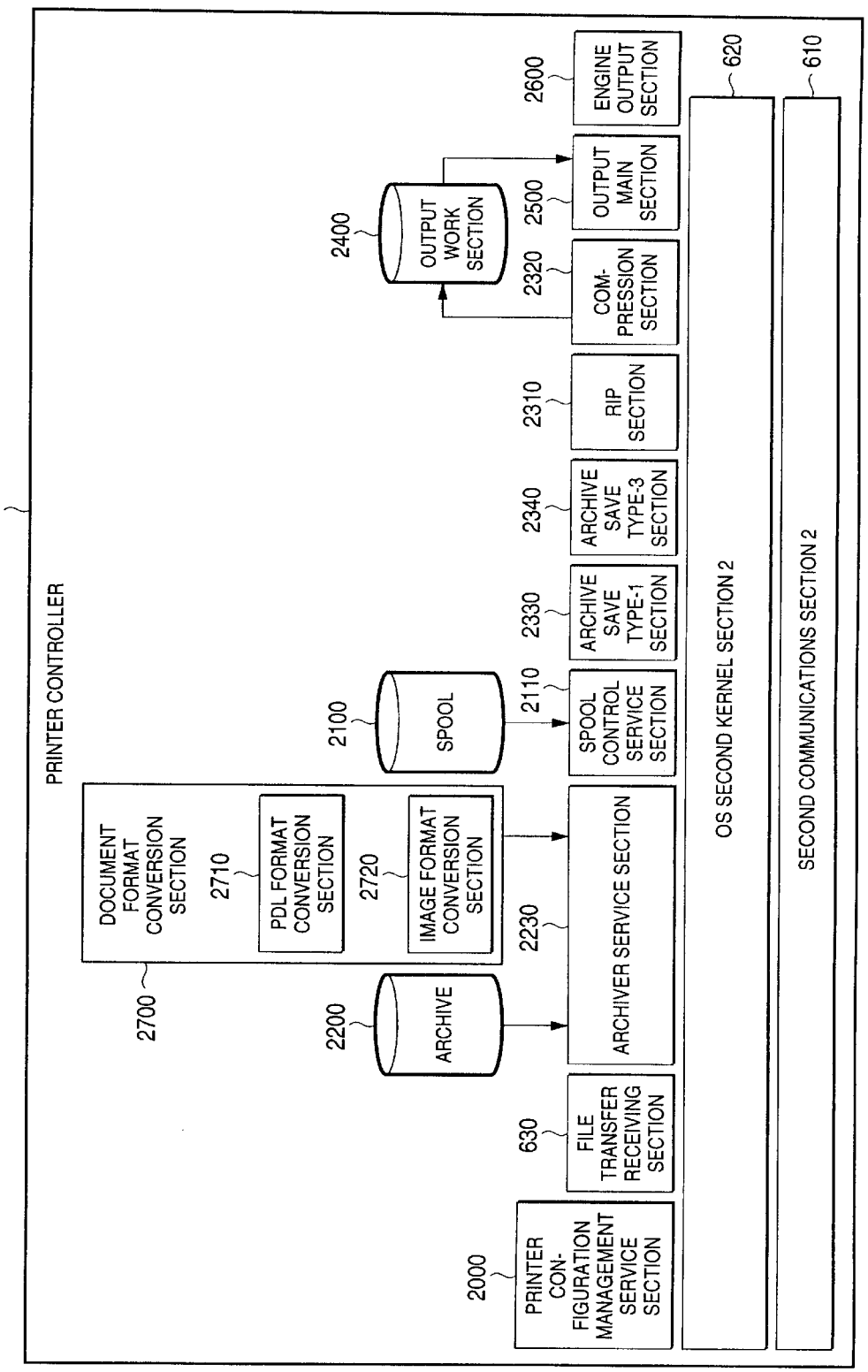
FIG. 6 is a functional block diagram for describing the configuration of a printer controller according to the present invention.

As shown in FIG. 6, the printer controller 200 comprises individual processing sections such as a second communications section 610, a second OS kernel section 620, a spool 2100, the archive 2200, an output work section 2400, and individual processing sections connected to the second OS kernel section 620.

The second OS kernel section 620 is principal software (also called an operating system) for controlling a user interface and hardware constituting the printer controller 200.

The second communications section 610 comprises hardware and software and enables the printer 100 to establish, over the network 400, communication with individual devices (e.g., computers, a printer, a scanner, etc.) connected to the network 400. The second communications section 610 can be deemed as constituting a portion of the second OS kernel 620 and is shown as an independent element in order to clarify the relationship between the second communications section 610 and the second OS kernel 620.

The spool 2100, the archive 2200, and the output work section 2400 will now be described.

The spool 2100 is a queue for receiving and registering print requests issued to the printer controller 200 from the individual computers 310, 320, and 330. The printer controller 200 registers the print requests into the spool 2100 as print jobs in the sequence of receipt. At the time of registration, for each print request the following are registered together as a file: (a) management information such as a job name (jobs are numbered in consecutive order) registration time, and the volume (size) of the print job, used for managing the print job, and (b) the PDL document which is a content to be actually printed. The thus-registered jobs are read by a spool read section 2120 provided in the spool control service section 2110 shown in FIG. 2 in the sequence of receipt, and the thus-read jobs are passed to a subsequent print processing stage.

In response to the requests issued by the individual computers 310, 320, and 330 to the printer controller 200 for storing documents, the printer controller 200 stores the documents into the archive 2200. Various requests issued to the archive 2200, such as reference, registration, deletion, re-printing, and display/editing, are accepted and carried out by the archive control service section 2230 shown in FIG. 2. These requests are processed as requests, such as read and write requests, issued to the archive.

The archive 2200 will be described in further detail by reference to FIG. 5. The archive 2200 comprises a storage document group 2210 and an archive control file 2220. The stored document group 2210 is an actual collection of stored documents, and each document can be stored in the storage document group 2210 in the form of a PDL format and a dot image format in an arbitrary combination. More specifically, the document can be stored in (a) both the PDL format and the dot image format, (b) only the PDL format, or (c) only the dot image format.

Such a combination of formats is issued as a parameter when one of the computers 310, 320, and 330 directs the printer controller 200 to store a document. When no parameter is issued, a default value is employed. Alternatively, a previously-used value maybe employed in lieu of the default value. The default value is a value determined at the time of setup or installation. The previously-used value is a parameter specified upon the previous storage of a document. In FIG. 5, a document 1 is stored both in a PDL format (2211-$a$) and a dot image format (2211-$b$). A document 2 is stored in a like manner in a PDL format (2212-$a$) and a dot image format (2212-$b$); and a document "n" is also stored in a PDL format (2215-$a$) and a dot image format (2215-$b$). A document 3 is stored in only a PDL format (2213-$a$); and a document N is also stored in only a PDL format (2216-$a$). A document 4 is stored in only a dot image format (2214-$b$).

The archive control file 2220 is a management file for the purposes of effecting management and storage of the stored document group 2210 and speeding up operations of the stored document group 2210.

In addition to the archive control file 2220, there is also provided an archive control table 2240, which is on a memory corresponding to 711 into which are stored contents identical to those of the archive control file 2220. As a result, access to the archive 2200; more specifically, the stored document group 2210, by the archive control service section 2230 is greatly improved. Usually, the archive control table 2240 is used when the archive 2200 is managed by the archive control service section 2230. Therefore, the archive control table 2240 improves processing performance for managing the archive 2200. When a printer is booted in the initial stages, contents of archive control file 2200 are copied in the archive control table 2240. After that, the processing is scelped with referring and updating the archive control table 2240 by the archive control service section 2230. And when a printer is powered off, contents of the archive control table 2240 are copied in the archive control file 2220. Further, the output work area 2400 is used as a work area when the printer controller 200 prints a document or stores a document into the archive 2200 in the form of a dot image format.

The individual processing sections are packaged on a unit-of-work basis and in the software field are collectively called a task or process. The second OS kernel section 620 switches execution of jobs according to the status of input/output between the printer controller 200 and an external device or apparatus, as well as according to the state of processing performed in the printer controller 200. As a result, the print and archive storage performance of the printer controller 200 are improved, thus enhancing print throughput and archive storage throughput.

More specifically, there are provided as tasks a printer configuration management service section 2000, the archive control service section 2230, the spool control service section 2110, the archive save type-1 section 2330, a RIP section 2310, a compression section 2320, an output mainprocess section 2500, and an engine output section 2600.

Details of processing in each task will be described later by reference to FIGS. 2, 4, and 5. First, the outline of the processing is described.

The printer configuration management service section 2000 is a processing section for carrying out a request issued by the printer configuration management instruction section 3180 of each of the computers 310, 320, and 330.

As has already been described, the archive control service section 2230 is a processing section for carrying out a request issued by the archive control instruction section 3170 provided in each of the computers 310, 320, and 330.

As has already been described, the spool control service section 2110 is a processing section for carrying out a request issued by the spool control instruction section 3160 provided in each of the computers 310, 320, and 330.

The archive save type-1 section 2330 is a processing section for reading a print job that has already been stored in the spool 2100 and for storing the thus-read print job into the archive 2200 in the PDL format. In effect, the spool read section 2120 reads a print job and receives document data of PDL format constituting a portion of the print job. Then, the thus-read document data are stored in the archive 2200.

The RIP section 2310 receives a document of PDL format and executes rastar-image-processing; i.e., character elements, graphics elements, and image elements, all of which constitute the PDL document, are expanded to dot styles, thereby outputting a dot image. The dot image output from the RIP section 2310 is passed to the compression section 2320.

The compression section 2320 receives a yet-to-be-compressed document of dot image format and subjects the thus-received document to image compression processing, thereby reducing the volume of data of the document. The resultant compressed dot image is output to the output work section 2400.

The output main-process section 2500 reads compressed dot image data from the output work section 2400 and outputs the thus-read data to the engine output section 2600.

The engine output section 2600 receives, as input, compressed dot image data from the output main-process section 2500 and subjects the thus-received image data to various processing steps. Subsequently, the image data are output to the printer engine 500.

The dot image data that have already been compressed by the compression section 2320 are decompressed by an engine interface adapter 2640 provided in the engine output section 2600, thereby extracting original raw dot image data. The thus-extracted original raw dot image data are output to the print engine 500.

Processing relating to the previously-described respective tasks are carried out by means of software. The print system maybe provided with auxiliary hardware for sharing the load of executing a portion of or the entire processing relating to each task, thereby enhancing the processing performance for each task. For instance, the print system may be provided with auxiliary hardware for supporting the load of the RIP section 2310 and the compression section 2320, thereby yielding great effects. Even in the present invention, when an improvement in performance is desired, auxiliary hardware is optionally added to the print system.

Processing relating to the printer controller 200 will be described in more detail by reference to FIG. 2. The principal elements constituting the printer controller 200 shown in FIG. 2 have already been explained.

Now, the printer controller 200 is explained with emphasis on data flow.

A request issued by the printer configuration management instruction section 2180 is received and carried out by the printer configuration management service 2000.

A request 2111 for registering a print job in the spool (hereinafter referred to simply as a "registration request 2111") is received by the spool control service section 2110 and is registered in the spool 2100 as a print job. As described in connection with FIG. 3, the computer 300 outputs the registration request 2111 to the printer according to one of the following two methods:

(a) the type-1 application program outputs the registration request 2111 by way of the logical printer driver section 3130; and (b) the type-2 application program directly outputs the registration request 2111 without passing the same through the logical printer driver section 3130.

The respective print jobs stored in the spool are sequentially read by the spool read section 2120. The spool read section 2120 analyzes each of the processing requests issued by the respective computers 310, 320, and 330, thereby determining the category into which each processing request falls. The categories are respectively assigned code 1 to code 7.

(1) Printing only: code 1,
(2) Storage of the print job in only PDL format: code 2,
(3) Storage of the print job in only dot image format: code 3
(4) Storage of the print job in both PDL format and dot image format: code 4,
(5) Printing and storage of the print job in PDL format: code
(6) Printing and storage of the print job in dot image format: code 6, and
(7) Printing and storage of the print job in both PDL and dot image formats: code 7.

Upon issuance of a processing request for printing the print job or storing the print job in the dot image format, as in the case of code 1, 3, 4, 6, or 7, the spool read section 2120 outputs to the RIP section 2310 the PDL document constituting the read print job. The RIP section 2310 subjects the print job to the foregoing processing and outputs the result of such processing to the compression section 2320. The compression section 2320 subjects the output from the RIP section 2310 to the foregoing compression processing, thereby outputting a compressed dot image to the output work section 2400.

Upon issuance of a processing request for printing the print job, as in the case of code 1, 5, 6, or 7, the output main-process section 2500 outputs the data read from the output work section 2400 to the engine output section 2600 through use of the print control section 2510. The engine output section 2600 receives the compressed dot image from the output main-process section 2500 and subjects the thus-received image to various types of processing. The resultant output is delivered to the printer engine 500.

The print control section 2510 performs the following processing operations:

(1) page sequence control, and
(2) setting of engine control information and finisher control information for each page.

Through (1) page sequence control, the logical sequence of document pages received by each of the computers 310, 320, and 330 is converted to a physical page sequence required by the printer engine 500 at the time of printing.

At the time of single-sided printing, a page sequence is usually not converted.

At the time of double-sided printing, a page sequence is converted into a physical page sequence required by the printer engine 500. The following two types of page sequence conversion are usually available.

(a) Cyclic Double-Sided Printing

A physical page sequence of pg. 1, pg. 2, pg. 3, pg. 4, pg.5, pg. 6, pg. 7, pg. 8, pg. 9, and pg. 10 is converted into a physical page sequence determined by the maximum number of sheets retained in the printer engine for each sheet size. Provided that the number of sheets retained is 3 and ten pages are to be printed, the foregoing page sequence is converted to another page sequence of pg. 2, pg. 4, pg. 6, pg. 1, pg. 8, pg. 3, pg. 10, pg. 5, pg. 7, and pg. 9.

(b) Intermediate Tray Double-Sided Printing

A physical page sequence of pg. 1, pg. 2, pg. 3, pg. 4, pg. 5, pg. 6, pg. 7, pg. 8, pg. 9, and pg. 10 is converted into a physical page sequence determined by the maximum number of receivable sheets of an intermediate tray set for each sheet size. Provided that the maximum number of receivable sheets of the intermediate tray is 3 and ten pages are to be printed, the foregoing page sequence is converted to another page sequence of pg. 4, pg. 5, pg. 6, pg. 1, pg. 2, pg. 3, pg. 9, pg. 10, pg. 7, and pg. 8.

During the processing operation (2), engine control information and finisher control information are set for each page. Information about a paper feed section and a paper discharge section is set as engine control information, and information about stapling, punching, flat stitching, and saddle stitching is set as finisher control information.

Upon issuance of a request for storing a document in the dot image format, as in the case of code 3, 4, 6, or 7, the output main-process section 2500 stores the data read from the output work section 2400 into the archive 2200 as a document of dot image format, through use of the archive save type-2 section 2520.

Upon issuance of a request for storing a document in the PDL format, as in the case of code 2, 4, 5, or 7, the spool read section 2120 outputs the PDL document constituting the thus-read print job to the archive save type-1 section 2330. The archive save type-1 section 2330 stores an input document into the archive 2200 as a document of PDL format.

Various requests issued by the spool control instruction section 2160 are received and carried out by the spool control service section 2110. For example, the following items are prepared as various requests.
(1) Display the lists of print jobs,
(2) Delete a print job,
(3) Suspend a print job,
(4) Release a print job from a suspended state,
(5) Display information about details of a print job,
(6) Stop the printer for a period of time,
(7) Restart the printer,
(8) Delete all the print jobs stored in the printer,
(9) Display a printer status, and
(10) Display specifications and settings of the printer.

Various requests issued by the archive control instruction section 2170 are received and carried out by the archive control service section 2230. As mentioned previously, the following items are prepared as various requests.
(1) Display the list of documents,
(2) Delete a document,
(3) Reprint a document,
(4) Display and edit a document,
(5) Change a document name,
(6) Change the authorization to access a document,
(7) Make a folder,
(8) Delete a folder,
(9) Change a folder name, and
(10) Change the authorization to access a folder.

Processing details of the engine output section 2600 are described by reference to FIG. 4. The engine output section 2600 comprises the output buffer section 410, an engine/finisher control section 420, an engine control driver 430, an engine interface adapter 2640, a finisher control driver 440, a finisher interface adapter 770, a panel control driver 450, and a panel interface adapter 760.

The engine output section 2600 sequentially receives, from the print control section 2510, the data of dot image format whose page sequence has been converted. The thus-received data are stored in the output buffer 410. This output buffer 410 has a two-page layout and is capable of concurrently processing a receiving job and an outputting job (which will be described later).

The engine/finisher control section 420 is implemented in the form of a task or process that has been described previously. While reading the management information from the output buffer section 410, the engine/finisher control section 420 outputs the data of dot image format stored in the output buffer section 410 to the printer engine 500, where the data are actually printed. At this time, the engine control driver 430 and the finisher control driver 440 are used as device drivers. The device drivers 430 and 440 serve as library programs for making I/O processing functions available for the printer engine 500 and the finisher and effect real-time control among physical devices, such as a printer engine and a finisher. The panel control driver 450 is also made available as a device driver, and the engine/finisher control section 420 and other processing sections can utilize the panel control driver 450 at the time of control of the control panel.

The individual device drivers 430, 440, and 450 control input from and output to devices via hardware adapters for controlling devices as device there are the printer engine 50, the finisher, and the control as hardware adapters, there are interface adapter 2640, the finisher interface adapter 770, and the panel interface adapter 760. Although the finisher and the control panel are not shown in the drawings, they are the same as those used in an ordinary printer.

Figure 7:
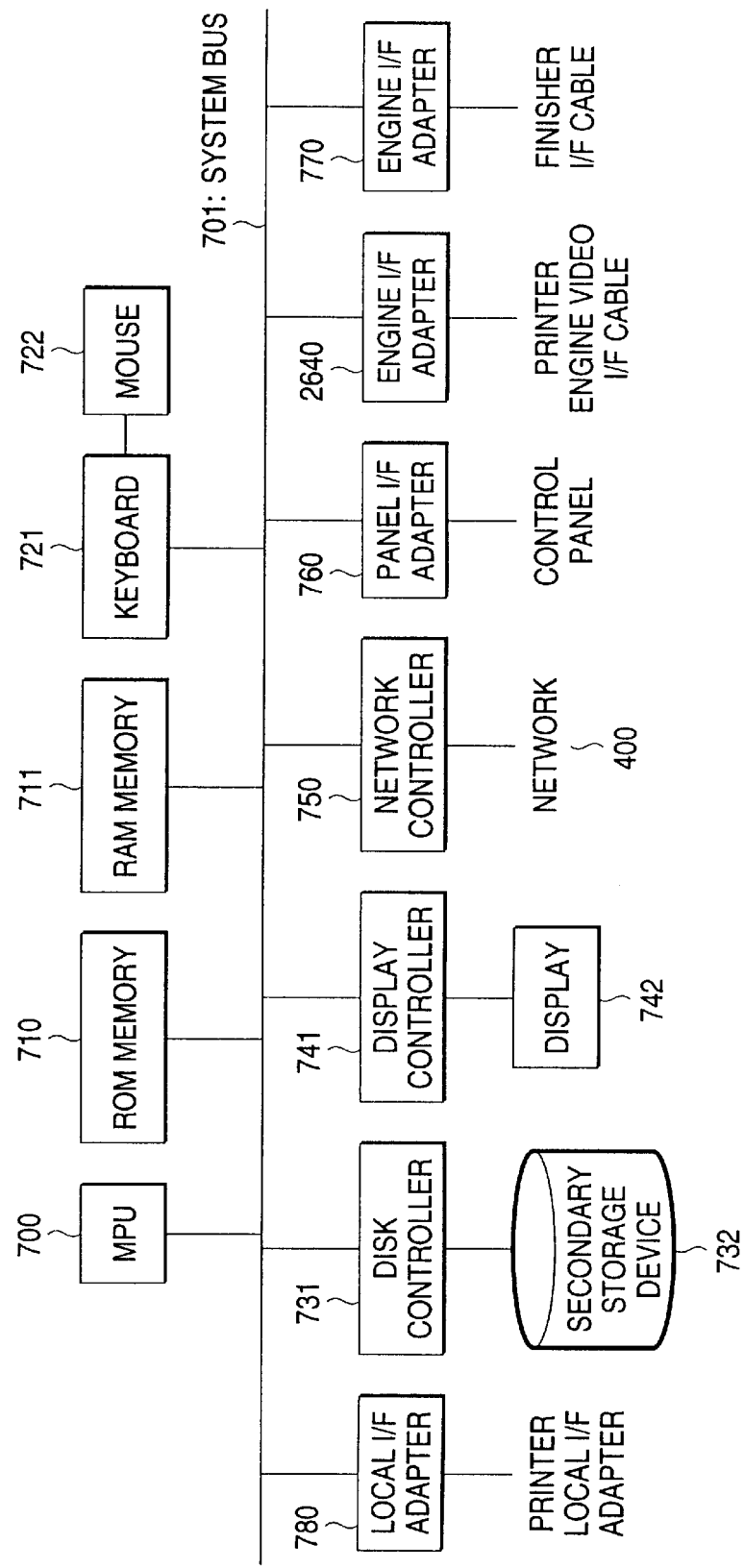
FIG. 7 is a schematic diagram showing the hardware configuration of the printer controller according to the present invention.
Figure 8:
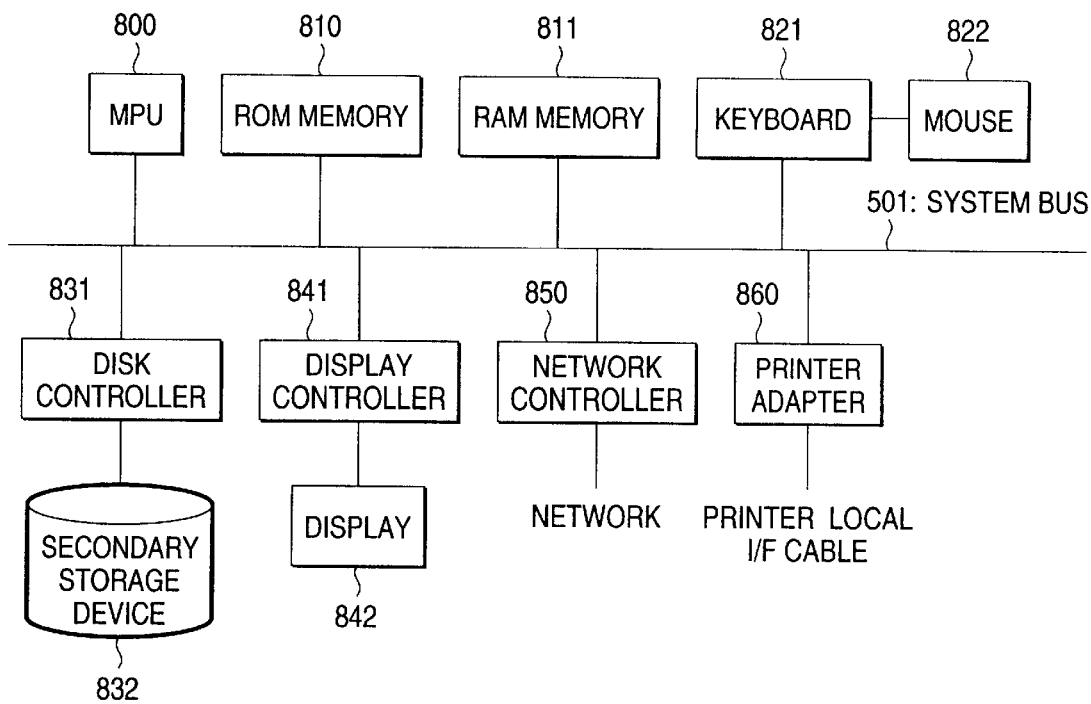
FIG. 8 is a schematic diagram showing the hardware configuration of the computer according to the present invention.

Hardware configuration of individual devices constituting the print system according to the present invention will now be described by reference to FIGS. 7 and 8.

First, the printer controller 200 is described by reference to FIG. 7.

The printer controller 200 comprises an MPU 700, a system bus 701, ROM 710, RAM 711, a keyboard 721, a mouse 722, a disk controller 731, a secondary storage device 732, a display controller 741, a display 742, a network controller 750, a local interface adapter 780, a panel interface adapter 760, an engine interface adapter 2640, and a finisher interface adapter 770.

The system bus 701 permits flow of various input/output signals to and from the MPU 700 (e.g., an address signal, a data signal, and other control signals).

The MPU 700 receives input signals from and outputs signals to peripheral devices, such as the keyboard 721, the secondary storage device 732, the display 742, and the network 400, and memory devices such as the ROM 710 and the RAM 711, by way of the system bus 701.

The keyboard 721 is an input device comprising a plurality of input keyboards and is connected to a mouse which is one type of pointing device. The secondary storage device 732 is connected to the system bus 701 via the disk controller 731, and the display 742 is connected to the system bus 701 via the display controller 741. The system bus 701 of the print system is connected to the network 400 such as a LAN or WAN via the network controller 750.

Ethernet, Token-Ring, FDDI (Fiber Distributed Data Interface), ATM (Asynchronous Transfer Mode), and ISDN (Integrated Service Digital Network) may be employed as the physical interface of the network 400. According to the type of the physical interface used, appropriate hardware logic is used as the hardware logic of the network controller 750.

The local interface adapter 780 is used for connecting the printer controller 200 directly to the computers 310, 320, and 330. In this case, Centronics interface, SCSI (Small Computer System Interface), a fiber channel, IEEE1394 interface, USB, RS-232C, RS-422/423, or the like may be employed as an interface 105 between the printer controller 200 and the computers 310, 320, and 330.

The panel interface adapter 760 serves as an interface between the control panel and the system bus 701. In this case, RS-232C or a custom-made interface may be used as the interface.

The engine interface adapter 2640 serves as an interface between the printer engine 500 and the system bus 701, and a vide interface may be used as the interface.

The finisher interface adapter 770 serves as an interface between the finisher and the system bus 701. In this case, RS-232C, SCSI, and a custom-made interface may be used as the interface.

The ROM 710 stores an initial boot program [also called IPL (Initial Program Loading)] of the printer controller 200 and a portion of character fonts.

The RAM 711 stores (a) a program for controlling the printer controller 200, (b) the remaining character fonts, (c) various buffer memory devices, (d) various management tables, and other data. The control program (a) and the character fonts (b) are loaded from the secondary storage device 732 and stored into the RAM 711 by means of the IPL program. Alternatively, the control program (a) and the character fonts (b) maybe stored in the ROM 710 in advance instead of being stored in the RAM 711. Conversely, it may be the case that no character fonts are stored in the ROM 710 and all the character fonts are be stored in the RAM 711.

In accordance with an instruction issued by the MPU 700, the engine interface adapter 2640 processes input/output signals exchanged between the control panel and the printer engine 500.

The engine interface adapter 2640 reads data from the output buffer 410 and sends the thus-read data to the printer engine 500 (corresponding to signals 451-a and 451-b shown in FIG. 4), through use of a DMA (direct memory access) function incorporated in the engine interface adapter 2640. Upon completion of reading of dot image data corresponding to the one page of paper from the output buffer section 410, the engine interface adapter 2640 transmits an interrupt signal (i.e., a fragment of a bus signal for MPU 700) to the MPU 700, whereby the MPU 700 activates interruption processing to thereby terminate the reading of data from the output buffer 410. During the read termination interruption processing, information representing that the output buffer having undergone reading operations can be used for printing of another page is written in the management table. Further, the tasks such as compression section 2320, which wait for space to be available in the output buffer 410 are released from a waiting state.

The engine interface adapter 2640 decompresses the thus-read compressed dot image data to an original uncompressed dot image. The dot image is then converted into serial data through parallel-to-serial conversion. The thus-converted serial data are output to the printer engine 500 by use of the image transfer signal 451-b exchanged between the engine interface adapter 2640 and the printer engine 500.

The engine interface adapter 2640 transmits to the printer engine 500 commands relating to an inquiry and an instruction and receives a response status from the printer engine 500, through use of a signal 452 for the purposes of transmitting commands to and receiving response status from the printer engine 500.

The engine interface adapter 2640 may be packaged according to two methods; i.e., a method of mounting, on the engine interface adapter 2640, a sub-MPU specifically designed for use therewith; and a method of causing the MPU 700 to perform required control processing operations without use of such a sub-MPU. The engine interface adapter 2640 may be packaged by use of either of the two methods.

Hardware configuration of the computer 300 will now be described by reference to FIG. 8. The computer 300 comprises an MPU 800, a system bus 801, ROM 810, RAM 811, a keyboard 821, a mouse 822, a disk controller 831, a secondary storage device 832, a display controller 841, a display 842, a network controller 850, and a printer adapter 860. Of these constituent elements, those other than the printer adapter 860 can be embodied in the same manner as in the case of the printer controller 200.

The printer adapter 860 is used for connecting the computer 300 directly to the printer controller 200 through use of the printer local interface cable. Centronics interface, SCSI, a fiber channel, IEEE1394 interface, USB, RS-232C, or RS-422/423 may be used as an interface between the computer 300 and the printer controller 200.

Further, individual documents stored in the archive may be managed by reference to document names and attributes of the documents. In this case, the attributes may include a storage format group of arbitrary combinations of PDL format, a display/editing format, uncompressed dot image format, and compressed dot image format.

Attributes of respective documents will now be described by reference to FIG. 14. Each of the documents is given two attributes; for example, an edit attribute 1402 and a print attribute 1403. Although the edit attribute 1402 is not necessarily required in the first embodiment and is used in second and third embodiments, the edit attribute 1402 is now described.

The edit attribute 1402 is given two values: an editable value (assigned a mark indicated by 1402-1) and an edited value (assigned a mark indicated by 1402-2).

The editable value 1402-1 represents that the document assigned this value is stored also in PDL format and can be displayed and edited through use of an application program, as will be described in the second embodiment.

The edited value 1402-2 represents that the document assigned this value is of PDL format, has already been edited by means of the application program, and cannot be subjected to subsequent display/editing operations by use of the application program (definition 1).

The edited value 1402-2 may be defined as follows: The document assigned the edited value 1402-2 may be displayed and edited repeatedly through use of the application program (definition 2).

The document may be opened and displayed on the screen any number of times but cannot be edited more than once (definition 3).

The edited value 1402-2 may be set to any one of definitions 1, 2, and 3 or may be set so as to support possible combinations of definitions 1, 2, and 3. In a case where only definition 2 is employed for the edited value 1402-2, no problems arise in operation even if the edited value 1402-2 is not indicted on the screen display shown in FIG. 14.

The print attribute 1403 is assigned two values: a printable value (assigned a mark indicated by 1403-1), and a high-speed printable value (assigned a mark indicated by 1403-2).

A document assigned the high-speed printable value may be read as being printable immediately.

The printable value 1403-1 represents that the document assigned this value can be reprinted but may not necessarily be able to be printed immediately. The reason for this is that the document 1411 is stored only in PDL format and not in dot image format.

The high-speed printable value 1403-2 represents that the document assigned this value can be reprinted at high speed according to the highest performance of the printer engine. The reason for this is that the document 1411 is stored also in dot image format.

In the present print system, reprinting of a document from dot image format is performed faster than is reprinting of the same document from PDL format. For this reason, the print attribute 1403 is assigned the foregoing two values. When a document of PDL format is reprinted, the document is subjected to processing relating to the RIP section 2310 and the compression section 2320, thereby preparing a document of dot image format (in a compressed state) in the output work section 2400. Then, the document is printed. In contrast, when a document of dot image format is reprinted, the document is subjected to neither the processing relating to the RIP section 2310 nor the processing relating to the compression section 2320. The document of dot image format (in a compressed state) stored in the output work section 2400 can be reprinted. Particularly, it is difficult to ensure that the maximum per-page processing time required by the RIP section 2310 is limited to less than a given time. In contrast, when a document is reprinted from dot image format, reprinting of the document compatible with the highest performance of the printer engine can be ensured.

Each document is assigned only one name 1401 but two lines of descriptions relating to the edit attribute 1402, the print attribute 1403, the size 1404, the name of a person who registered (date/time) 1405, and the name of a final user (date/time) 1406. Descriptions on the upper line represent the attributes of the PDL document, and descriptions on the lower line represent the attributes of the dot image document.

More specifically, the document 1411 is stored in PDL format, and hence information about the editable value 1402-1, the size of the PDL document, the name of a person and date/time of registration, and the name of a user and date/time of the final access is recorded on an upper line 1411-1. The document 1411 is not stored in the dot image format, and information about the printable value 1403-1 (stored in the PDL format) is recorded on a lower line 1411-2. Since the document 1411 is not stored in the dot image format, other items, such as the size of the dot image document, the name of a person and date/time of registration, and the name of a final user date/time, are left blank.

Since the document 1412 is stored in PDL format but has already been edited, information about the edited value 1402-2, the size of the PDL document, the name of a person and date/time of registration, and the name of a user and date/time of the final access is recorded in an upper line 1412-1. Further, the document 1412 is also stored in dot image format, and hence information about the high-speed printable value 1403-2, the size of the dot image document, the name of a person and date/time of registration, and the name of a user and date/time of the final access is recorded on a lower line 1412-2.

Under the foregoing control, when the computer requests the printer to reprint a document by use of the document name, a reprint processing section provided in the printer determines, from the storage format group which is one of the attributes of the document stored in the archive under the document name, that in what combination of PDL format, display/editing format, uncompressed dot image format, and compressed dot image format, the document is stored.

The document is printed again according to the optimum method corresponding to the result of such determination. For example, a determination is made as to whether or not a document of dot image format is stored in the archive of the printer. If the dot image format document is stored, the document is reprinted through use of the document of dot image format. In this case, since the print attribute of the document is assigned the high-speed printable value, as shown in FIG. 14, the user can ascertain that the document can be printed at the highest performance of the print engine by only watching the print attribute at the screen. In the case of the document of PDL format which is not stored in dot image format, the document is reprinted through RIPing the PDL format document. Even in this case, since the print attribute of the document is indicated as being printable, the user can ascertain that the document may not be printed at the highest performance of the print engine document by only watching the print attribute of the document at the screen.

As mentioned above, according to the first embodiment, the user of the printer can direct the printer to print and store documents in an arbitrary combination, by way of the computer. As a result, the user of the computer can utilize the printer by designation of an arbitrary combination of print and storage commands according to the type and objective of a document, as necessitated.

A document may be stored in PDL format and in dot image format, as well as in an arbitrary combination of these formats. Accordingly, in a case where a document is simply reprinted, a stored document of dot image format is used for high-speed reprinting of the document. A stored document of PDL format is used for assembly editing on imposition, thereby enabling high-quality editing of the document without involving deterioration in picture quality.

The user of the computer can direct the printer to use a combination of storage formats according to the type and objective of the document, as necessitated.

When an existing document is captured in the archive and is used for reprinting and display/editing purposes, the range of documents capable of being captured can be broadened, because the print system supports both PDL format and dot image format.

As mentioned above, the printer and the print system according to the first embodiment provide not a simple print system but a highly sophisticated documentation system, thus enhancing ease-of-use to a great extent.

A second embodiment of the present invention will now be described.

Drawings to be used for describing a second embodiment are based on the drawings relating to the first embodiment, and constituent elements are further added to these drawings. More specifically, constituent elements are added to FIGS. 2, 3, and 6. Other drawings relating to the first embodiment are also used without modification in describing the second embodiment.

The constituent elements added to the drawings in the second embodiment are unnecessary for the first embodiment. In order to save space used by the drawings, the same drawings are used for describing the two embodiments.

First, the constituent elements added to FIGS. 2, 3, and 6 will be described.

As shown in FIG. 6, the printer controller 200 is additionally provided with a document format conversion section 2700. This document format conversion section 2700 is directed to convert the documents of storage format stored in the archive 2200 into documents of display/editing format. The document format conversion section 2700 is further provided with a PDL format conversion section 2710 and an image format conversion section 2720.

The PDL format conversion section 2710 converts a document of PDL format (one of the storage formats) stored in the archive 2200 into a document of display/editing format. Examples of the PDL format comprise PostScript (registered trademark) by Adobe Corporation, PDF (Portable Document Format; registered trademark) by Adobe Corporation, PCL-5, PCL-5E, PCL-6, and PCL-XL (all of which are registered trademarks) by Hewlett Packard Corporation, and like formats. Further, the display/editing format is enables the type-1 application program 3140 and the type-2 application program 3150 installed in the computer 300 to display a document on a screen for users to view or to edit the contents of the document (i.e., to perform assembly editing or imposition). Examples of the display/editing format include PDF (Portable Document Format: registered trademark) by Adobe Corporation, HTML (Hypertext Markup Language), XML (Extensible Markup Language), SGML (Standard Generalized Markup Language), EMF (Enhanced Metafile) by Microsoft Corporation, and like languages. These formats do not match the PDL formats, but are interchangeable therewith.

The image format conversion section 2720 converts a compressed document of dot image format stored in the archive 2200 into an uncompressed document of dot image format through decompression expansion. Any of the compression/decompression algorithms may be used as a compression/decompression algorithm. Example of compression/decompression algorithms include CCITT class 3 or 4, LZW, modified LZW, JBIG, JPEG, and like algorithms. Further, decompression performed by the image format conversion section 2720 is effected by means of (a) software installed in the MPU 700 or (b) hardware specifically designed for decompression purposes (not shown in FIG. 7).

As shown in FIG. 6, the printer controller 200 is further additionally provided with an archive save type-3 section 2340. This archive save type-3 section 2340 stores documents of display/editing format into the archive 2200 and will be described later by reference to FIG. 2.

Figure 2:
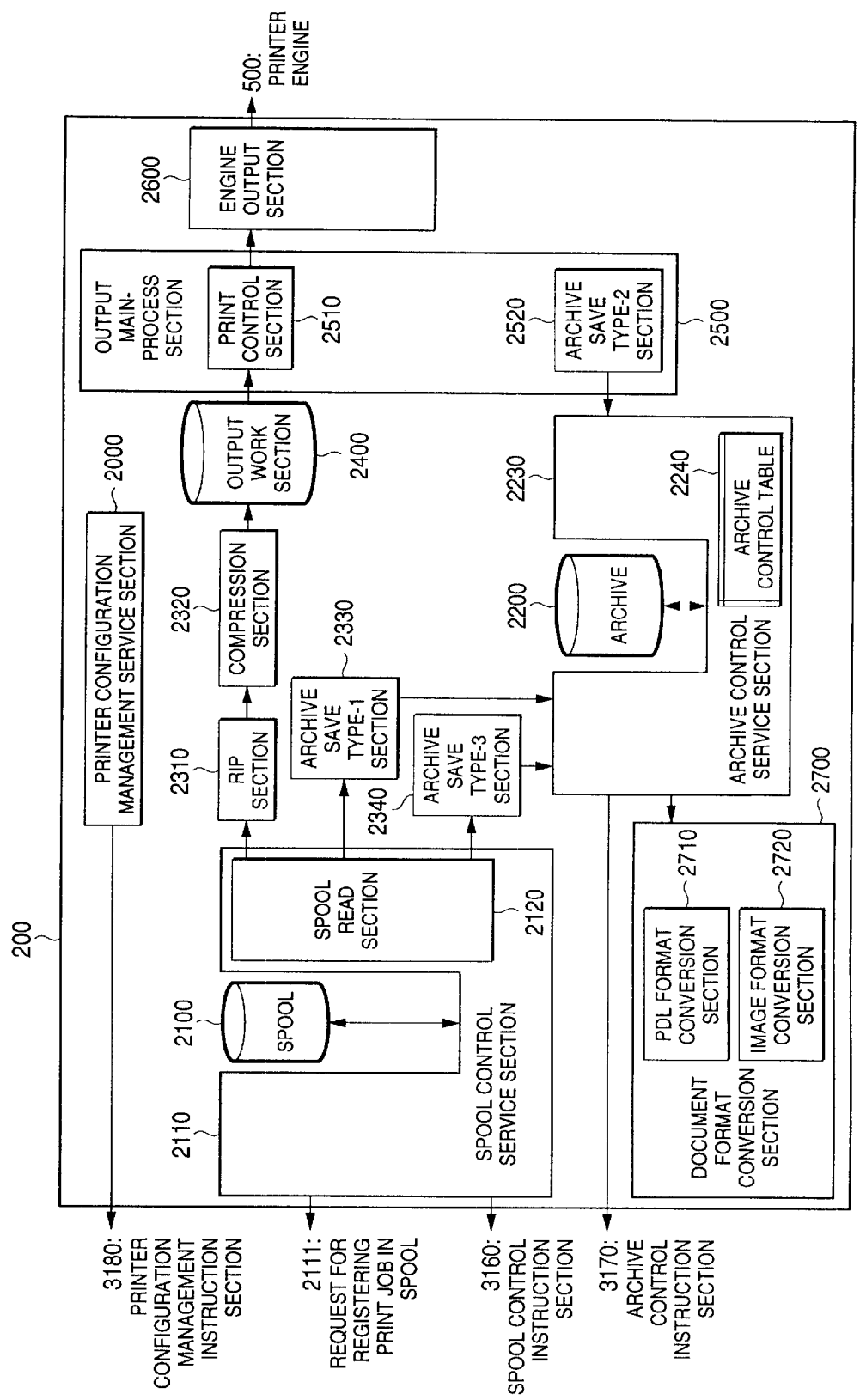
FIG. 2 is a schematic diagram for describing a method of controlling a printer controller according to the present invention.

In the same sense as in the case of FIG. 6, the printing controller of FIG. 2 is also additionally provided with the document format conversion section 2700, the PDL format conversion section 2710, the image format conversion section 2720, and the archive save type-3 section 2340. As shown in FIG. 2, the archive control instruction section 3170 directs the archive control service section to perform various service operations for the purpose of managing the archive. At this time, in accordance with the instruction issued to the archive control service section 2230 from the archive control instruction section 2170, there arises a necessity for converting the format of the stored document, as required. In such a case, the archive control service section 2230 converts the format of the document through use of the document format conversion section 2700.

As a result of addition of the foregoing constituent elements to the processing controller, processing details of the printer controller 200 shown in FIG. 2 are changed in the following points.

The respective print jobs stored in the spool are sequentially read by the spool read section 2120. The spool read section 2120 analyzes each of the processing requests issued by the respective computers 310, 320, and 330, thereby determining the category into which each processing request falls. The categories are assigned respective codes. A greater number of assigned codes are available as compared with the case of the first embodiment. 45 2720, (1) Printing only: code 1, (2) Storage of the print job in only PDL format: code 2, (3) Storage of the print job in only dot image format: code 3, (3-1) Storage of the print job in only display/editing format: code 31, (4) Storage of the print job in both PDL format and dot image format: code 4, (4-1) Storage of the print job in both PDL format and display/editing format: code 41, (4-2) Storage of the print job in both dot image format and display/editing format: code 42, (4-3) Storage of the print job in both PDL format, dot image format, and display/editing format: code 43, (5) Printing and storage of the print job in PDL format: code 5, (6) Printing and storage of the print job in dot image format: code 6, (6-1) Printing and storage of the print job in display/editing format; code 61, (7) Print and storage of the print job in both PDL and dot image formats: code 7, (8) Print and storage of the print job in both PDL and display/editing formats: code 8, (9) Print and storage of the print job in both dot image and display/editing formats: code 9, and

(10) Print and storage of the print job in PDL, dot image, and display/editing formats: code 10. Upon issuance of a processing request for printing a document or storing a document in the dot image format, as in the case of code 1, 3, 4, 42, 43, 5, 6, 61, 7, 8, 9, or 10, the spool read section 2120 outputs the PDL document constituting the read print job to the RIP section 2310. The RIP section 2310 subjects the print job to the foregoing processing and outputs the result of such processing to the compression section 2320. The compression section 2320 subjects the output from the RIP section 2310 to the foregoing compression processing, thereby outputting a compressed dot image to the output work section 2400.

Upon issuance of a processing request for printing a document, as in the case of code 1, 5, 6, 61, 7, 8, 9, or 10, the output main-process section 2500 outputs the data read from the output work section 2400 to the engine output section 2600, through use of the print control section 2510. The engine output section 2600 receives the compressed dot image as an input from the output main-process section 2500 and subjects the thus-received image to various types of processing. The resultant output is delivered to the printer engine 500.

The processing details of the print control section 2510 performs are the same as those of the print control section 2510 in the first embodiment.

Upon issuance of a processing request for storing a document in dot image format, as in the case of code 3, 4, 42, 43, 6, 7, 9, or 10, the output main-process section 2500 outputs the data read from the output work section 2400 to the archive 2200 in dot image format, through use of the archive save type-2 section 2520.

Although the foregoing description is based on the premise that the printer controller is provided with the compression section 2320, the printer controller 200 may be embodied similarly without use of the compression section 2320. Specifically, in a case where the printer controller 200 stores a document in dot image format, if the printer controller 200 is provided with the compression section 2320, the compression section 2320 may compress dot image data, so that the dot image data are stored in a compressed state. If the printer controller 200 is not provided with the compression section 2320, the dot image data are not compressed and stored in an uncompressed state. The compression section 2320 is embodied as software or hardware.

Upon issuance of a processing request for storing a document in PDL format, as in the case of code 2, 4, 41, 43, 5, 7, 8, or 10, the spool read section 2120 outputs to the archive save type-1 section 2330 a document of PDL format constituting a print job that is read. The archive save type-1 section 2330 stores the input document into the archive 2200 as a document of PDL format.

Upon issuance of a processing request for storing a document in display/editing format, as in the case of code 31, 41, 42, 43, 61, 8, 9, or 10, the spool read section 2120 outputs to the archive save type-3 section 2340 a document of display/editing format constituting a print job that is read. The archive save type-3 section 2340 stores the input document into the archive 2200 as a document of display/editing format.

In the present embodiment, not all the application programs can store documents in the display/editing format. Storage of a document in the display/editing formation is effected only when an application program which belongs to type-2 application programs makes a direct request for storage while bypassing the logical printer driver section 3130.

Figure 3:
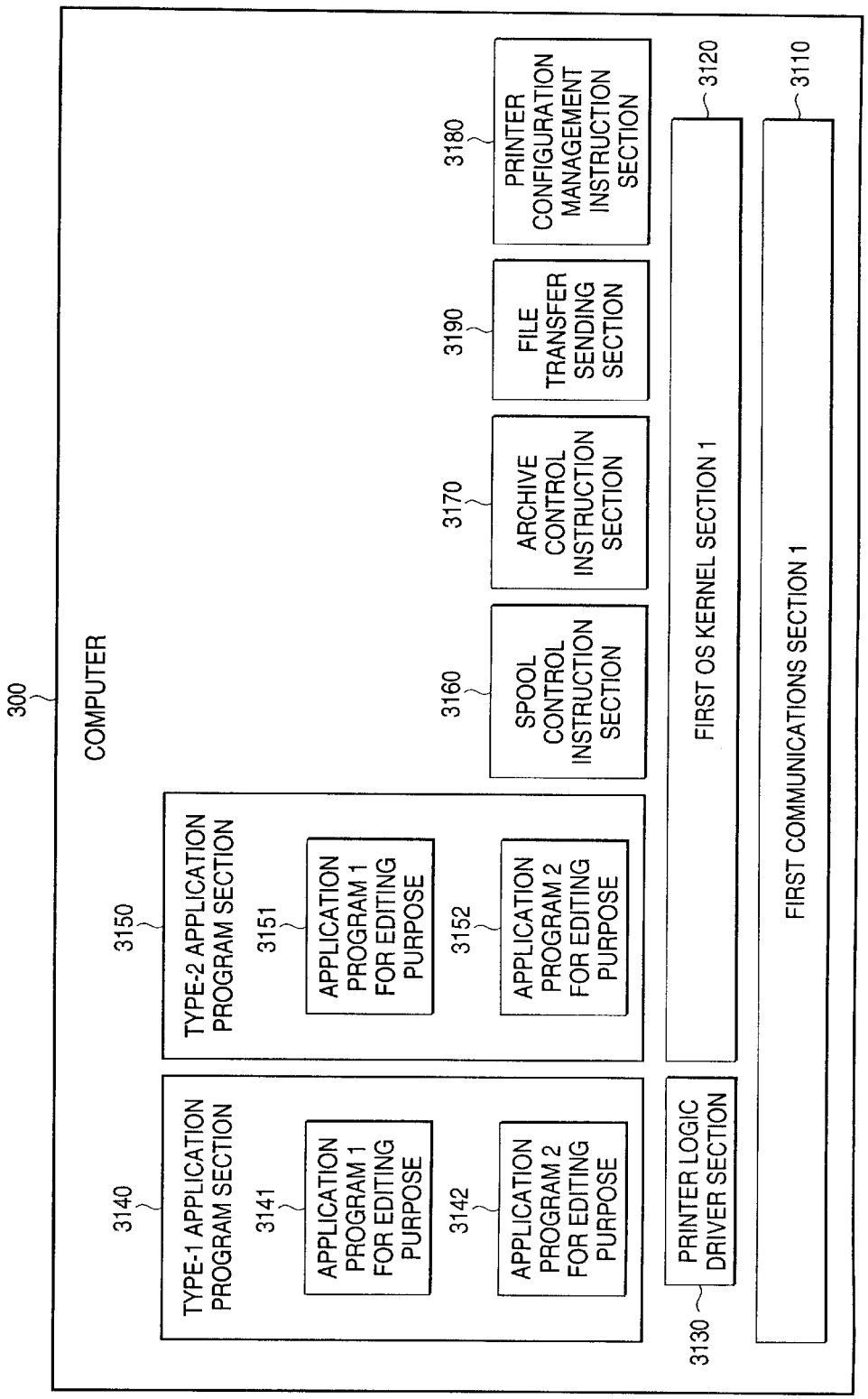
FIG. 3 is a functional block diagram for describing the configuration of a computer according to the present invention.

As shown in FIG. 3, the computer 300 is provided with application program 1 for editing purpose sections 3141 and 3151 and application program 2 for editing purpose sections 3142 and 3152. The application program 1 for editing purpose section 3141 and the application program 2 for editing purpose section 3142 pertain to a type-1 application program section 3140; and the application program 1 for editing purpose section 3151 and the application program 2 for editing purpose section 3152 pertain to a type-2 application program section 3150. The application program 1 for editing purpose sections 34 and 3151 enable display and editing of documents of the display/editing format like PDF. The application program 2 for editing purpose sections 3142 and 3152 enable display and editing of documents of dot image format. The dot image format comprises two types of formats: a compressed dot image format, and an uncompressed dot image format. The following description is based on the premise that the application program 2 for editing purpose section 3152 can process only a document of uncompressed dot image format. Even when the application program 2 for editing purpose section 3192 can directly process a document of compressed dot image format, the same function can be embodied.

Further, one program may be given two functions; i.e., the function of the application program 1 for editing purpose section and the function of the application program 2 for editing purpose section. More specifically, the application program 1 for editing purpose section 3141 and the application program 2 for editing purpose section 3142 may be embodied in the form of a single program; and the application program 1 for editing purpose section 3151 and the application program 2 for editing purpose section 3152 may also be embodied in the form of a single program. Alternatively, the application program 1 for editing purpose sections 3141 and 3151 may be embodied in the form of a single program, and the application program 2 for editing purpose sections 3142 and 3152 may also be embodied in the form of a single program. Further, the application program 1 and 2 for editing purpose sections 3141, 3142, 3151, and 3152 may be embodied in the form of a single program. An example of the application program 1 for editing purpose section 3141 corresponds to Acrobat Exchange (registered trademark) by Adobe Corporation.

In the present embodiment, in a case where a document is stored in a storage format by the computer into the archive of the printer, when the computer requests the printer to display and edit the document, the following operations are performed.

The printer determines whether or not the format of the document stored in the archive of the printer is identical with a document format which is called display/editing format and is required by the application program for editing purpose installed in the computer. If the formats are identical, the document is read without modification and is transferred to the computer. In contrast, if the formats differ from each other, the format of the document stored in the archive is converted into the display/editing format by use of the document format conversion section provided in the printer, and the thus converted document is transferred to the computer.

The application program for editing purpose which program installed in the computer reads the document of display/editing format transferred from the printer and subjects the document to display and editing.

In a case where the computer stores a document in a storage format called PDL format into the archive of the printer, when the computer requests the printer to display and edit the document, the following operations are performed.

The printer determines whether or not the format of the document stored in the archive of the printer is identical with a document format which is called display/editing format and is required by the application program for editing purpose installed in the computer. If the formats are identical, the document is read without modification and is transferred to the computer. In contrast, if the formats differ, the document of PDL format (i.e., storage format) stored in the archive is converted into the display/editing format by use of the PDL format conversion section 2710 provided in the printer, and the thus-converted document is transferred to the computer.

The application program 1 for editing purpose section 3141, 3151 installed in the computer, reads the document of display/editing format transferred from the printer and subjects the document to display and editing.

In a case where the computer stores a document in dot image format into the archive of the printer, when the computer requests the printer to display and edit the document, the following operations are performed.

The printer determines the format of the document stored therein. If the document is of uncompressed dot image format, the printer reads the document without modification and transfers the thus read document to the computer. In contrast, if the document is of compressed dot image format, the document of compressed dot image format stored in the archive is converted into a document of uncompressed dot image format by use of the image format converter section 2720 provided in the document format converter section, and the thus-converted document is transferred to the computer.

The application program 2 for editing purpose section 3142, 3152 installed in the computer, reads the document of uncompressed dot image format transferred from the printer and subjects the document to display and editing.

Further, individual documents stored in the archive are managed by reference to names and attributes of the documents. In this case, the attributes include a storage format group of arbitrary combinations of PDL format, display/ editing format, uncompressed dot image format, and compressed dot image format. Of these attributes, the edit and print attributes of each document and the use of these attributes are the same as those described in connection with the first embodiment by reference to FIG. 14. The edit attribute 1402, the editable value 1402-1, and the edited value 1402-2, all being described in connection with FIG. 14, are effective for the second embodiment but not indispensable.

Under the foregoing control, the following processing operation is performed.

(1) When the computer requests the printer to re-print the document by reference to the document name archive control service section, section 2230 etc. provided in the printer determines, from the storage format group, which is one of the attributes of the document stored in the archive under the document name, that in what combination of PDL format, display/editing format, uncompressed dot image format, and compressed dot image format, the document is stored. The document is reprinted according to the optimum method corresponding to the result of such determination. For example, a determination is made as to whether or not a document of dot image format is stored in the archive of the printer. If the dot image format document is found to be stored, the document is reprinted through use of the document of dot image format. Further, if the document of dot image format is not stored but a document of PDL format is found, the document is reprinted by RIPing the document of PDL format. The details of paragraph (1) are the same as the reprint request processing operations performed in the first embodiment.

Processing described in the following paragraph (2) is also made possible in the second embodiment.

(2) When the computer requests the printer to reprint the document by reference to the document name archive control service section, section 2230 etc. provided in the printer determines, from the storage format group, which is one of the attributes of the document stored in the archive under the document name, that in what combination of PDL format, display/editing format, uncompressed dot image format, and compressed dot image format, the document is stored. The document is reprinted according to the optimum method corresponding to the result of such determination.

For example, a determination is made as to whether or not a document of display/editing format is stored in the archive of the printer. If such a document is found, the document is transferred to the computer without modification. The application program for editing purpose 1 sections 3141 and 3151 installed in the computer read the document received from the printer and subject the document to display and editing. The word "reprint" is used especially indicating the document printing in the archive. The function is the same as usual "print". So it may also be called "print".

If a document of display/editing format is not determined to be stored in the archive of the printer but a document of PDL format is found, the document of PDL format is converted to a document of display/editing format through use of the PDL format converter section 2710 provided in the printer. The thus-converted document is then transferred to the computer. The application program 1 for editing purpose sections 3141 and 3151 installed in the computer read the document received from the printer and subject the document to display and editing.

If neither a document of display/editing format nor a document of PDL format are determined to be stored in the archive of the printer but a document of dot image format is found, another determination is further made as to whether or not the document of dot image format is of uncompressed type. If the document is determined to be of uncompressed type, the document is read and transferred to the computer without modification. In contrast, if the document is determined to be not of uncompressed type but of compressed type, the document of compressed dot image format stored in the archive is converted into a document of uncompressed dot image format through use of the image format conversion section 2720 provided in the printer. The thus-converted document is transferred to the computer.

The application program 2 for editing purpose sections 3142 and 3152 installed in the computer read the document of uncompressed bit image format transferred from the printer and subject the document to display and editing.

For example, the edit attribute 1402 shown in FIG. 14 may be used in the following manner:

(a) If the edit attribute 1402 of a document has the editable value 1402-1, the document can be edited by the application program for editing purpose.

(b) If the edit attribute 1402 has the edited value 1402-2, an editing operation which the application program for editing purpose can perform is controlled according to which one of definitions 1, 2, and 3 corresponds to the definition of the edited value 1402-2. For instance, when the edited value 1402-2 is definitions 1 and 3, the document cannot be edited more than one time.

According to the second embodiment which has been described above, even when no match exists between the format in which the printer stores a document and the display/editing format required by the application program for editing purpose, the storage format is converted into the display/editing format, thereby enabling the application program for editing purpose to display and edit the document. More specifically, even when a document is stored in either the PDL format or the compressed dot image format, the document is converted into the display/editing format or the uncompressed dot image format, thereby enabling the application program for editing purpose to display and edit the document. Thus, convenience and ease-of-use can be enhanced.

In the first and second embodiments, individual documents are managed by reference to names and attributes of the documents. Consequently, the documents are easy to identify without involving confusion when the user operates (i.e., reprints or displays/edits) each of the documents stored in the archive. Even when there are documents which are identical in content, these documents can be assigned different document names. In this case, however, once the user has assigned different document names to the documents, he will later be unsure about whether or not they are identical. The expression "identical documents" used herein signifies documents which produce a completely identical print result without regard to whether the documents are stored in PDL format, compressed dot image format, or uncompressed dot image format. If different document names are assigned to documents which differ only in storage format and if the user forgets that these documents are identical, a check as to whether or not the documents are identical requires comparison between the documents in the form of dot image data, into which the documents are converted immediately before being printed by the printer engine 500. Such a check involves a very large amount of processing, thus deteriorating ease-of-use and system performance.

A third embodiment of the present invention will now be described. The present embodiment is directed to a method of storing and registering the documents stored in the computer 300 to the archive 2200 of the printer controller 200 in connection with the first and second embodiments.

Figure 18:
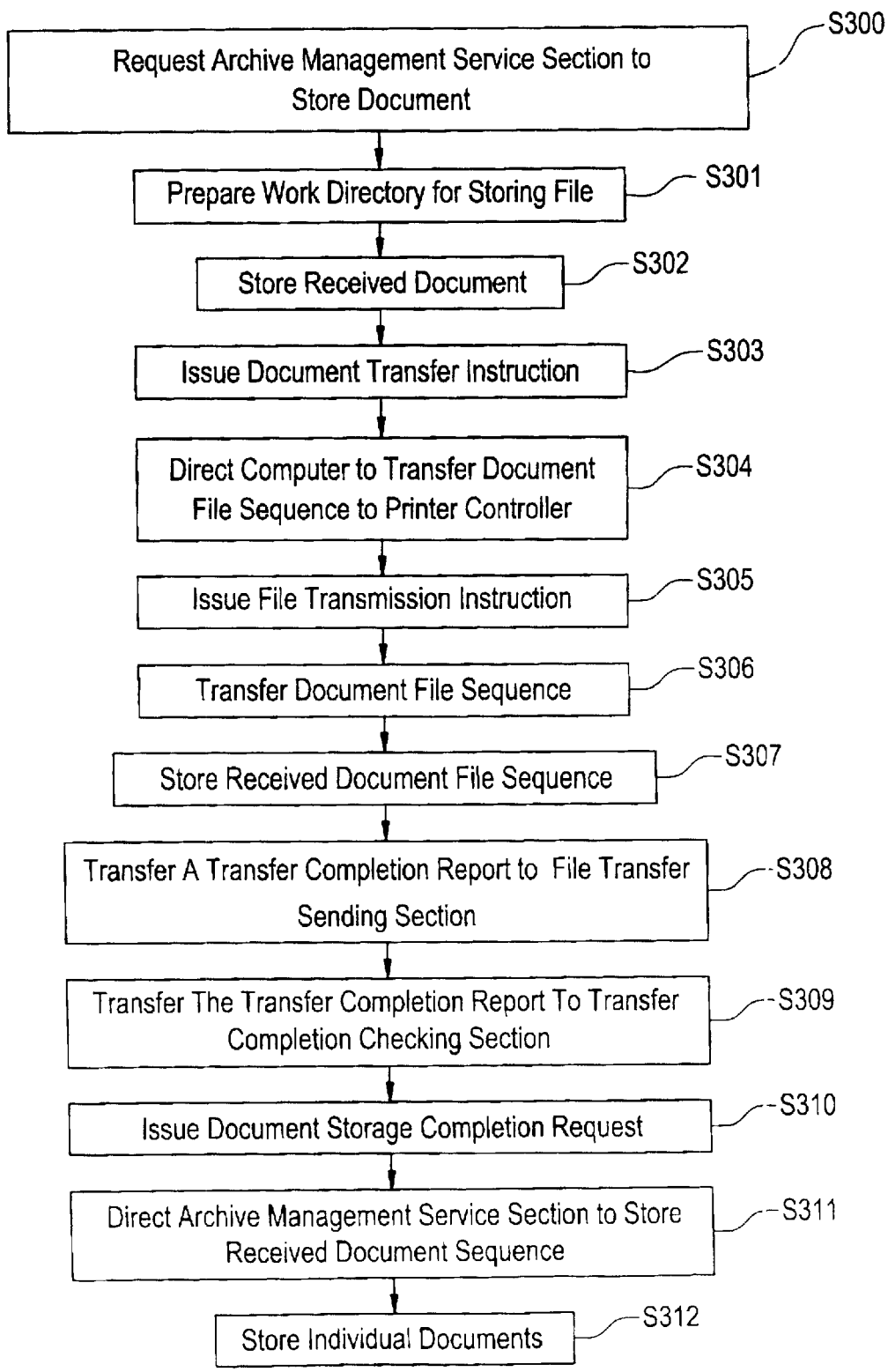
FIG. 18 is a flow diagram showing the operations of another non-limiting embodiment of the present invention.

FIG. 18 is a flow diagram showing the operations of the third embodiment of the present invention. In operation S300, an archive management service section provided in the printer controller is requested to store the document while a storage folder name is attached to the start request as an additional parameter from an archive control instruction section provided in the computer. In operation S301, preparing a work directory and a name of the work directory for storing a file transfer receiving section, in which the work directory is named the storage folder name designated by the additional parameter, is performed. In operation S302, the received document file is stored under the storage folder name in the printer controller. In operation S303, a document transfer instruction is issued from the archive control instruction section to the file transfer receiving section. In operation S304, the computer is directed to transfer a document file sequence to the printer controller while a document file name sequence is attached to the document file sequence as an additional parameter. In operation S305, a file transmission instruction is issued from a file transfer sending section to the file transfer receiving section. In operation S306, the document file sequence is transferred to the file transfer receiving section while the document file name sequence is attached to the document file sequence as an additional parameter. In operation S307, the thus-received document file sequence is stored in a storage folder according to the file transfer receiving section. In operation S308, a transfer completion report is transferred to the file transfer sending section after the file transfer receiving section has completed storage of all the document files into the storage folder. In operation S309, the transfer completion report is transferred from the file transfer sending section to a transfer completion checking section provided in the archive control instruction section so as to report that all the document files have been stored in the storage folder within the printer controller. In operation S310, a document storage completion request is issued from the archive control instruction section to the archive management service section. In operation S311, the archive management service section is directed to store the received document sequence into the storage folder while a sequence pair comprising (a) a new storage folder name and (b) a new file name is attached to each of the documents as an additional parameter, so that the names (a) and (b) can be renamed as a new storage folder name and a new document name to each of the document files. In operation S312, individual documents stored in the storage folder are stored into the archive by reference to the names (a) and (b) according to a storage section of the archive management service section. The operations shown in FIG. 18 are discussed in greater detail in the following paragraphs.

The third embodiment will now be described by reference to FIGS. 3, 6, and 15. Constituent elements are added to FIGS. 3 and 6 used in connection with the first and second embodiments. Other drawings used in connection with the first and second embodiments are also used, without modification, for describing the third embodiment.

The constituent elements added to the drawings used in the third embodiment are unnecessary for the first and second embodiments. To save space used by the drawings, the same drawings are used for describing the three embodiments.

First, the constituent elements added to FIGS. 3 and 6 will be described.

As shown in FIG. 3, a file transfer sending section 3190 is added to the computer 300. The file transfer sending section 3190 reads a document from a secondary storage device (referred to as a "local secondary storage device") connected directly to the computer 300, or from a secondary storage device shared over the network 400 (hereinafter referred to as a "shared secondary storage device"), and transfers the thus-read document to a file transfer receiving section 630 (which will be described later) provided in the printer controller 200.

As shown in FIG. 6, the printer controller 200 is additionally provided with the file transfer receiving section 630. The file transfer receiving section 630 receives the document that has been transmitted by the file transfer sending section 3190.

Procedures used for storing and registering the documents stored in the computer 300 to the archive 2200 of the printer controller 200 will be described by reference to FIG. 15.

First, there will be described details of instructions 1501, 1502, and so on representing exchange of data among individual elements shown in FIG. 15.

1501: Request for commencing storage of a document (storage folder name)

1502: Making a work directory

1503-1: Instruction for transferring documents (document file name sequence)

1503-2: Instruction for transmitting a file

1503-3: Storage of document files corresponding to the document file name sequence into a storage folder which has the storage folder name

1504-1: Report of transfer completion

1504-2: Receipt of transfer completion report

1505: Request for completing storage of the documents [a pair of sequences comprising (a) new storage folder name and (b) new document file name for each document]

1506: Storage of the document in the archive

Figure 15:
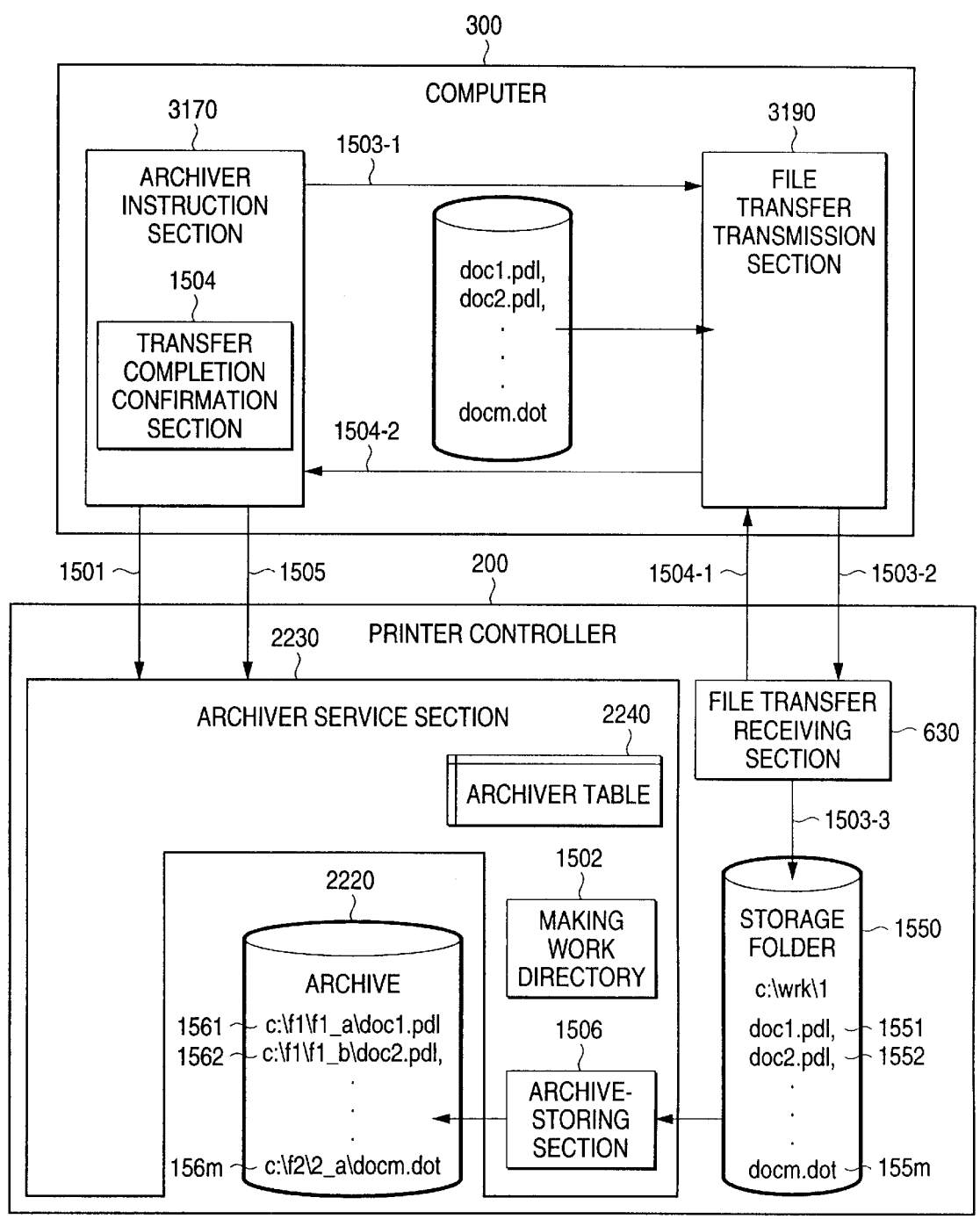
FIG. 15 is a functional block diagram for describing register of a document from the computer into the printer controller according to the present invention.

In FIG. 15, exchange of data is effected sequentially as shown below.

(1) The archive control instruction section 3170 provided in the computer 300 issues a document storage start request (1501) to the archive control service section 2230 provided in the printer controller 200. The request 1501 is assigned a storage folder name as an additional parameter; e.g., c:\wrk\1 .

(2) In accordance with the instruction 1501, the archive control service section 2230 makes a work directory for storing the file received by the file transfer receiving section 630 (1502). At this time, the storage folder name c:\wrk\1. (1550) specified by the additional parameter of the instruction 1501 is directly assigned as the name of the work directory. The printer controller 200 stores the received documents file under this storage folder name.

(3) The archive control instruction section 3170 issues a document transfer instruction (1503-1) to the file transfer sending section 3190, thereby directing the computer 300 to transfer the document files to the printer controller 200. A document file name sequence is added to the instruction 1503-1 as an additional parameter; e.g., doc1. pdl, doc2. pdl, docm.dot. Here, doc1.pdl and doc2.pdl are assumed to represent documents of PDL format, and docm.dot is assumed to represent a document of dot image format.

(4) As a result of the file transfer sending section 3190 issuing a file transmission instruction (1503-2) to the file transfer receiving section 630, the document files are transferred. As in the case with the instruction 1503-1, a document file name sequence is added to the file transfer instruction 1503-2 as an additional parameter.

In the present embodiment, a protocol such as ftp (file transfer protocol) or HTTP (Hypertext Transfer Protocol) is used for transferring a file between the file transfer sending section 3190 and the file transfer receiving section 630. More specifically, in a case where ftp is used as a protocol for file transfer, the file stored in the local or shared secondary storage device managed by the computer 300 is transferred to a program called ftp server (corresponding to the file transfer receiving section 630 shown in FIG. 15) provided in the printer controller 200. In a case where http is used as a protocol for file transfer, the file stored in the local or shared secondary storage device controlled by the computer 300 is transferred to a program called http server (corresponding to the file transfer receiving section 630 shown in FIG. 15) provided in the printer controller 200.

(5) The file transfer receiving section 630 stores the received document files in the storage folder, the name of which is 1550(c:\wrk\1'1550 (1503-3)). As a result, "m" documents doc1.pdl., doc2.pdl, . . . , docm.dot are stored in the storage folder 1550.

(6) The file transfer receiving section 630 transmits a transfer completion report (1504-1) to the file transfer sending section 3190 after having stored all the document files into the storage folder 1550.

(7) The file transfer sending section 3190 transmits the transfer completion report to the transfer completion confirmation section 1504 provided in the archive control instruction section 3170 (1504-2), thereby reporting that storage of all the document files into the storage folder 1550 has been ascertained.

(8) The archive control instruction section 3170 issues the document storage completion request (1505) to the archive control service section 2230, thereby directing storage, into the archive 2200, of the document file sequence that has been stored in the storage folder 1550. Each of the documents is assigned, as an additional parameter of the request 1505, a sequence pair comprising (a) a new storage folder name and (b) a new document file name; for example, c:\fl\fl_a, doc1.pdl., c:\fl\fl_b,doc2.pdl, . . . , c:\f2\f2_a, docm.dot.

Employment of the pair of names (a) and (b) is intended to enable assignment of a new storage folder name and a new document name to each document file. However, the original storage folder name and document file name may also be assigned to the document file. If the pair of names (a) and (b) are omitted, all the documents may be assigned their original storage folder names and original document file names.

(9) Finally, the archive-storing section 1506 provided in the archive management service 2230 stores individual documents 1551, 1552, . . . , 155m saved in the storage folder 1550 into the archive 2200 as documents 1561, 1562, . . . , 156m. After storage of the documents, processing is terminated.

In the event of failure of file transfer 1503-2 and 1503-3, the failures are reported by means of the transfer completion report 1504-1, and displayed on the screen of the computer 300 so that document re-transfer is indicated for users. In this case, storage of documents into the archive 2200 mentioned in connection with (8) is not effected, until re-transfer of the documents are succeeded.

The third embodiment yields the following advantageous results.

(1) At the time of storing documents from the computer 300 to the printer controller 200, standard file transfer means (such as ftp or http) can be employed for transferring files, thereby eliminating a need for developing a file transfer program. By use of a field-proven file transfer function such as ftp, the performance and reliability of file transfer can be ensured.

(2) Further, storage of files into the primary location; i.e., the archive 2200, can be effected after correct transfer of files to the receiving work directory (1550) has been ascertained.

As a result, the user and a system manager can ascertain and distinguish failures in storage of files into the archive 2200 and failures in file transfer. If files are directly stored into the archive 2200 without file transfer being ascertained, the user or the system manager may encounter difficulty identifying a failure, because the user cannot distinguish failures.

The present invention provides the user with not a simple printer but a highly sophisticated documentation system, thus significantly enhancing ease-of-use.

Figure 17:
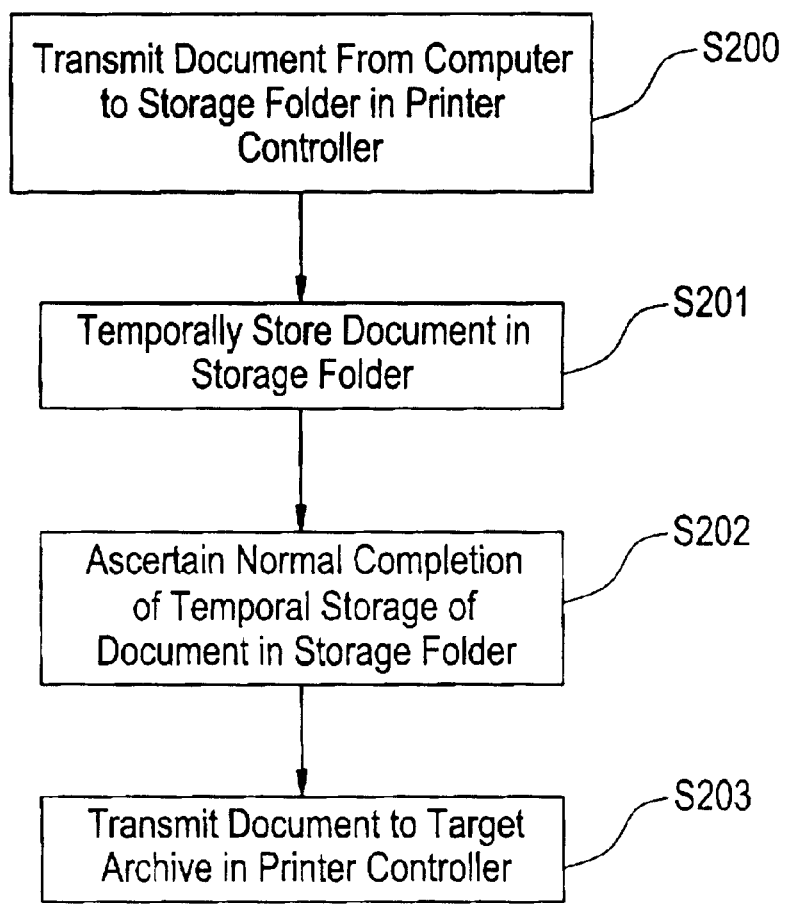
FIG. 17 is a flow diagram showing the operations of another non-limiting embodiment of the present invention.

FIG. 17, a flow diagram showing the operations of an embodiment of the present invention. In operation S200, a document stored in the computer is transmitted to a storage folder provided in a printer controller through file transfer. In operation S201, the document is temporarily stored in the storage folder. In operation S202, a normal completion of temporary storage of the document in the storage folder is ascertained. In operation S203, the document is transmitted to a target archive in the printer controller from the storage folder. The operations shown in FIG. 17 are discussed in greater detail in the following paragraphs.

What is claimed is:

1. A printing method for use with a print system including a computer and a printer connected to the computer directly or by way of a network, wherein the computer comprises: a program for preparing a document; and a logical printer driver for converting the document into a PDL document, the method comprising:
  directing the printer from the computer to print and store the PDL document prepared by the computer in an arbitrary combination of formats;
  transferring the PDL document from the computer to the printer;
  storing the document in an archive of the printer according to the instruction from the computer; and
  printing the document according to the at least one of the following computer instructions:
    (1) requesting the printer to reprint the document stored in the archive;
      determining whether or not a document of dot image format is stored in the archive of the printer;
      reprinting the document of dot image format if the document of dot image format is found; and
      reprinting the document after having plotting a document or PDL format if the document of dot image format is not found in the archive;
    (2) requesting the printer to display and edit a document, which has been stored in a PDL format in the archive of the printer;
      reading the document of PDL format from the archive of the printer;
      displaying the document; and
      editing the document,
    (3) requesting the printer to display and edit a document, which has been stored in a storage format in the archive of the printer from the computer;
      determining whether or not the format of the document stored in the printer is identical with the display/editing format required by an application program for editing purposes installed in the computer;

reading and transferring the document to the computer without modification if the formats are identical; and converting the document stored in the archive into a document of editing./display format through use of a document format conversion section provided in the printer if the formats differ from each other.

2. A printing method for use with a print system including a computer and a printer connected to the computer directly or by way of a network, wherein the computer comprises: a program for preparing a document; and a logical printer driver for converting the document into a PDL document, the method comprising:

directing the printer from the computer to print and store the PDL document prepared by the computer in an arbitrary combination of formats;

transferring the PDL document from the computer to the printer;

storing the document in an archive of the printer according to the instruction from the computer; and printing the document according to the at least one of the following computer instructions:

(1) requesting the printer to reprint the document stored in the archive;

determining whether or not a document of dot image format is stored in the archive of the printer;

reprinting the document of dot image format if the document of dot image format is found; and reprinting the document after having plotting a document of PDL format if the document of dot image format is not found in the archive;

(2) requesting the printer to display and edit a document, which has been stored in a PDL format in the archive of the printer;

reading the document of PDL format from the archive of the printer;

displaying the document; and editing the document, (3) requesting the printer to display and edit a document, which has been stored in a storage format in the archive of the printer from the computer;

determining whether or not the format of the document stored in the printer is identical with the display/editing format required by an application program for editing purposes installed in the computer;

reading and transferring the document to the computer without modification if the formats are identical; and converting the document stored in the archive into a document of editing./display format through use of a document format conversion section provided in the printer if the formats differ from each other (4) requesting the printer to display and edit a document, which has been stored in PDL format in an archive of the printer;

converting the document of PDL format stored in the archive into a document of display/editing format through use of a PDL format conversion section provided in the printer;

transmitting the thus-converted document to an application program 1 in the computer for editing purpose, which is one of a document preparation program and a combination instruction program installed on the computer;

displaying the document; and editing the document (5) requesting the printer to display and edit the stored PDL document;

determining whether or not the format of the document stored in the printer is identical with a document format which is called display/editing format and is required by an application program for editing purpose installed in the computer;

transferring the document from the printer to the computer without modification if the formats are identical;

converting the document of PDL formal (storage format) stored in the archive into a document of display/editing format through use of a PDL format conversion section provided in the printer, before transferring the thus-converted document to the computer, if the formats differ from each other;

transmitting the document of display/editing format transferred from the printer to an application program 1 for editing purpose, which is one of a document preparation program and a combination instruction program installed in the computer; and displaying and editing the document.

3. A printing method for use with a print system including a computer and a printer connected to the computer directly or by way of a network, the method comprising:

directing the printer from the computer to print and store a document prepared by the computer in an arbitrary combination of formats;

transferring the document from the computer to the printer;

printing the document according to the instructions from the computer, and storing the document in an archive of the printer according to the instructions from the computer, said instructions including at least one of:

(1) directing the printer to use an arbitrary combination of PDF format and dot image format as a storage format when directing the printer to store the document in the archive of the printer; and storing the document in the archive of the printer in an arbitrary combination of format and dot image format in accordance with the direction relating to the storage format issued by the computer;

(2) directing the printer to use of an arbitrary combination of PDL format, display/editing format, an dot image format as a storage format when storing a document;

storing the document in the archive of the printer in an arbitrary combination of PDL format, display/editing format, and dot image format in accordance with the direction relating to the storage format issued by the computer.

4. A printing method for use with a print system including a computer and a printer connected to the computer directly or by way of a network, the method comprising:

directing the printer from the computer to print and store a document prepared by the computer in an arbitrary combination of formats;

transferring the document from the computer to the printer;

printing the document according to the instructions from the computer, and storing the document in an archive of the printer according to the instructions from the computer, said instructions including at least one of:

(1) directing the printer to use an arbitrary combination of PDF format and dot image format as a storage format when directing the printer to store the document in the archive of the printer; and storing the document in the archive of the printer in an arbitrary combination of PDL format and dot image format in accordance with the direction relating to the storage format issued by the computer;

(2) directing the printer to use of an arbitrary combination of PDL format, display/editing format, an dot image format as a storage format when storing a document;

storing the document in the archive of the printer in an arbitrary combination of PDL format, display/ editing format, and dot image format in accordance with the direction relating to the storage format issued by the computer;

(3) managing each of the documents stored in the archive with reference to a name and attributes assigned to the document, wherein the attributes comprise a storage format group which includes an arbitrary combination of formats selected from PDL format, display/editing format, uncompressed dot image format, and compressed dot image format;

determining from the document name the combination of the formats in which the documents are stored, in accordance with the storage format group which is one of the attributes of the document stored in the archive, when the computer issues a request to the printer for reprinting the document with reference to the document name thereof; and reprinting the documents by means of an optimum method corresponding to the result of the determination.

5. A printing method for use with a print system including a computer and a printer connected to the computer directly or by way of a network, the method comprising:

directing the printer from the computer to print and store a document prepared by the computer in an arbitrary combination of formats;

transferring the document from the computer to the printer, printing the document according to the instructions from the computer, and storing the document in an archive of the printer according to the instructions from the computer, said instructions including at least one of:

(1) directing the printer to use an arbitrary combination of PDF format and dot image format as a storage format when directing the printer to store the document in the archive of the printer; and storing the document in the archive of the printer in an arbitrary combination of PDL format and dot image format in accordance with the direction relating to the storage format issued by the computer;

(2) directing the printer to use of an arbitrary combination of PDL format, display/editing format, an dot image format as a storage format when storing a document;

storing the document in the archive of the printer in an arbitrary combination of PDL format, display/ editing format, and dot image format in accordance with the direction relating to the storage format issued by the computer;

(3) managing each of the documents stored in the archive with reference to a name and attributes assigned to the document, wherein the attributes comprise a storage format group which includes an arbitrary combination of formats selected from PDL format, display/editing format, uncompressed dot image format, and compressed dot image format;

determining from the document name the combination of the formats in which the documents are stored, in accordance with the storage format group which is one of the attributes of the document stored in the archive, when the computer issues a request to the printer for reprinting the document with reference to the document name thereof; and reprinting the documents by means of an optimum method corresponding to the result of the determination (4) managing each of the documents stored in the archive with references to a name and attributes assigned to the document, in which the attributes comprise a storage format group which includes an arbitrary combination of formats selected from PDL format, display/editing format, uncompressed dot image format, and compressed dot image format;

determining from the document name the combination of formats in which the documents are stored, in conjunction with the storage format group which is one of the attributes of the document stored in the archive, when the computer issues a request to the printer for reprinting the document by reference to the document name to thereof; and displaying and editing the document by means of a document preparation program or a combination direction program install in the computer, according to an optimum method corresponding to the result of the determination.

6. A printing method for use with a print system including a computer and a printer connected to the computer directly or by way of a network, wherein storage of a document stored in the computer to an archive within a printer controller is effected according to procedures comprising the steps of:

requesting an archive management service section provided in the printer controller to store the document while a storage folder name is attached to the start request as an additional parameter from an archive control instruction section provided in the computer;

preparing a work directory and a name of the work directory for storing a file received by a file transfer receiving section, in which the work directory is named the storage folder name designated by the additional parameter;

storing the received document file under the storage folder name in the printer controller;

issuing a document transfer instruction from the archive control instruction section to the file transfer receiving section;

directing the computer to transfer a document file sequence to the printer controller while a document file name sequence is attached to the document file sequence as an additional parameter;

issuing a file transmission instruction from a file transfer sending section to the file transfer receiving section, transferring the document file sequence to the file transfer receiving section while the document file name sequence is attached to the document file sequence as an additional parameter;

storing the thus-received document file sequence in a storage folder according to the file transfer receiving section;

transferring a transfer completion report to the file transfer sending section after the file transfer receiving section has completed storage of all the document files into the storage folder;

transferring the transfer completion report from the file transfer sending section to a transfer completion checking section provided in the archive control instruction section so as to report that all the document files have been stored in the storage folder within the printer controller;

issuing a document storage completion request from the archive control instruction section to the archive management service section;

directing the archive management service section to store the received document sequence into the storage folder while a sequence pair comprising (a) a new storage folder name and (b) a new file name is attached to each of the documents as an additional parameter, so that the names (a) and (b) can be renamed as a new storage folder name and a new document name to each of the document files; and storing individual documents stored in the storage folder into the archive by reference to the names (a) and (b) according to a storage section of the archive management service section.

* * * * *